United States Patent
Miekka et al.

(10) Patent No.: US 6,540,865 B1
(45) Date of Patent: Apr. 1, 2003

(54) PRELAMINATE PRESSURE-SENSITIVE ADHESIVE CONSTRUCTIONS

(75) Inventors: Frederick N. Miekka, Sierra Madre, CA (US); William F. Scholz, Altadena, CA (US); Rick J. Verhines, Marina Del Rey, CA (US); Norman A. Conti, Painesville, OH (US); Karl Josephy, Los Angeles, CA (US)

(73) Assignee: Avery Dennison Corporation, Painesville, OH (US)

( * ) Notice: Subject to any disclaimer, the term of this patent is extended or adjusted under 35 U.S.C. 154(b) by 0 days.

(21) Appl. No.: 09/587,915

(22) Filed: Jun. 6, 2000

Related U.S. Application Data

(62) Division of application No. 08/999,525, filed on Sep. 26, 1997, now abandoned.
(60) Provisional application No. 60/026,819, filed on Sep. 27, 1996.

(51) Int. Cl.$^7$ .......................... B32B 31/12; B32B 31/18; B32B 31/26; B05D 5/10
(52) U.S. Cl. ..................... 156/249; 156/184; 156/297; 156/267; 156/289; 156/320; 156/324; 427/208.8
(58) Field of Search ................................ 156/184, 267, 156/269, 270, 256, 289, 247, 248, 249, 308.2, 320, 324; 427/208.2, 208.4, 208.8

(56) References Cited

U.S. PATENT DOCUMENTS 2,708,650 A   5/1955   Pullman et al. ............. 154/140
3,027,271 A   3/1962   Plasse et al. ................. 117/76

(List continued on next page.)

FOREIGN PATENT DOCUMENTS

| GB | 1058074 | 2/1967 |
| WO | WO9201555 | 2/1992 |
| WO | WO9311728 | 6/1993 |
| WO | WO9608539 | 3/1996 |

OTHER PUBLICATIONS

Irving Skeist, "Handbook of Adhesives," Chapman & Hall, 1990, pp. 478–483.*

(List continued on next page.)

*Primary Examiner*—Curtis Mayes
(74) *Attorney, Agent, or Firm*—Grant T. Langton, Esq.; Jeffer, Mangels, Butler & Marmaro LLP

(57) ABSTRACT

Prelaminate pressure-sensitive adhesive (PSA) constructions comprise, a first substrate, a coating or release material on a surface of the first substrate, a PSA layer disposed on the coating of release material, and a detackified layer (DL) disposed on a surface of the PSA layer to form a continuous film covering the PSA layer. In first and second embodiments of the construction the DL is activatable to form a tacky layer on top of the PSA layer for lamination with a second substrate. In a third embodiment, the DL includes constituents that when activated migrate into the PSA layer to expose the PSA layer tacky surface for lamination with a second substrate. The prelaminate PSA constructions are completely nonblocking to a minimum 24 hour blocking temperature of about 50° C. at pressure of about 40 kilopascals, thereby allowing such prelaminate PSA construction to be collected, stored, and or transported before being laminated without adhesive interference occurring between continuous layers. The DL in each embodiment is activatable in less than five seconds to provide a tacky layer having a sufficient open tack time to permit lamination at less than about 100° C.

18 Claims, 9 Drawing Sheets

U.S. PATENT DOCUMENTS

| | | | |
|---|---|---|---|
| 3,183,198 A | 5/1965 | Wagner | 260/18 |
| 3,257,228 A * | 6/1966 | Reed | |
| 3,343,978 A | 9/1967 | Engelbach | 117/76 |
| 3,471,357 A | 10/1969 | Bildusas | 161/165 |
| 3,843,480 A | 10/1974 | Dreher | 161/167 |
| 3,916,046 A * | 10/1975 | Youngberg | |
| 4,135,033 A | 1/1979 | Lawton | 428/344 |
| 4,331,727 A * | 5/1982 | Maas | |
| 4,391,853 A | 7/1983 | Pointon | 427/152 |
| 4,398,985 A | 8/1983 | Eagon | 156/233 |
| 4,853,421 A | 8/1989 | Hayes | 523/223 |
| 4,886,844 A | 12/1989 | Hayes | 523/223 |
| 5,025,043 A | 6/1991 | Smith | 523/326 |
| 5,095,058 A | 3/1992 | Smith et al. | 524/238 |
| 5,109,054 A | 4/1992 | Smith | 524/514 |
| 5,407,985 A | 4/1995 | Smith | 524/238 |
| 5,428,083 A | 6/1995 | Smith et al. | 523/414 |
| 5,436,061 A * | 7/1995 | Hanneman et al. | 427/208.4 |
| 5,539,025 A | 7/1996 | Smith et al. | 523/418 |
| 5,605,944 A | 2/1997 | Heebner | 523/404 |
| 5,709,918 A * | 1/1998 | Kimijima | 428/40.1 |
| 5,718,958 A * | 2/1998 | Scholz et al. | 428/40.1 |
| 6,080,261 A * | 6/2000 | Popat et al. | 156/249 X |

OTHER PUBLICATIONS

Charles V. Cagle, "Handbook of Adhesive Bonding," McGraw–Hill, 1973, pp. 8–1–8–30.*

C.R. Frihart et al., "Relationship of Dynamic Mechanical and Thermal Properties to Tack for Hot Melt Polyamide Films," *Hot Melt*, 1990, pp. 99–110.

Thomas Flanagan, "Hot–melt Adhesives," *Handbook of Adhesive Bonding*, pp. 8–1 thru 8–29, 1973.

Gordon, R.L., "Improved Bonding with Long Open Time Polyamides," *1994 Polymers, Laminations and Coatings Conference*, pp. 47–56.

* cited by examiner

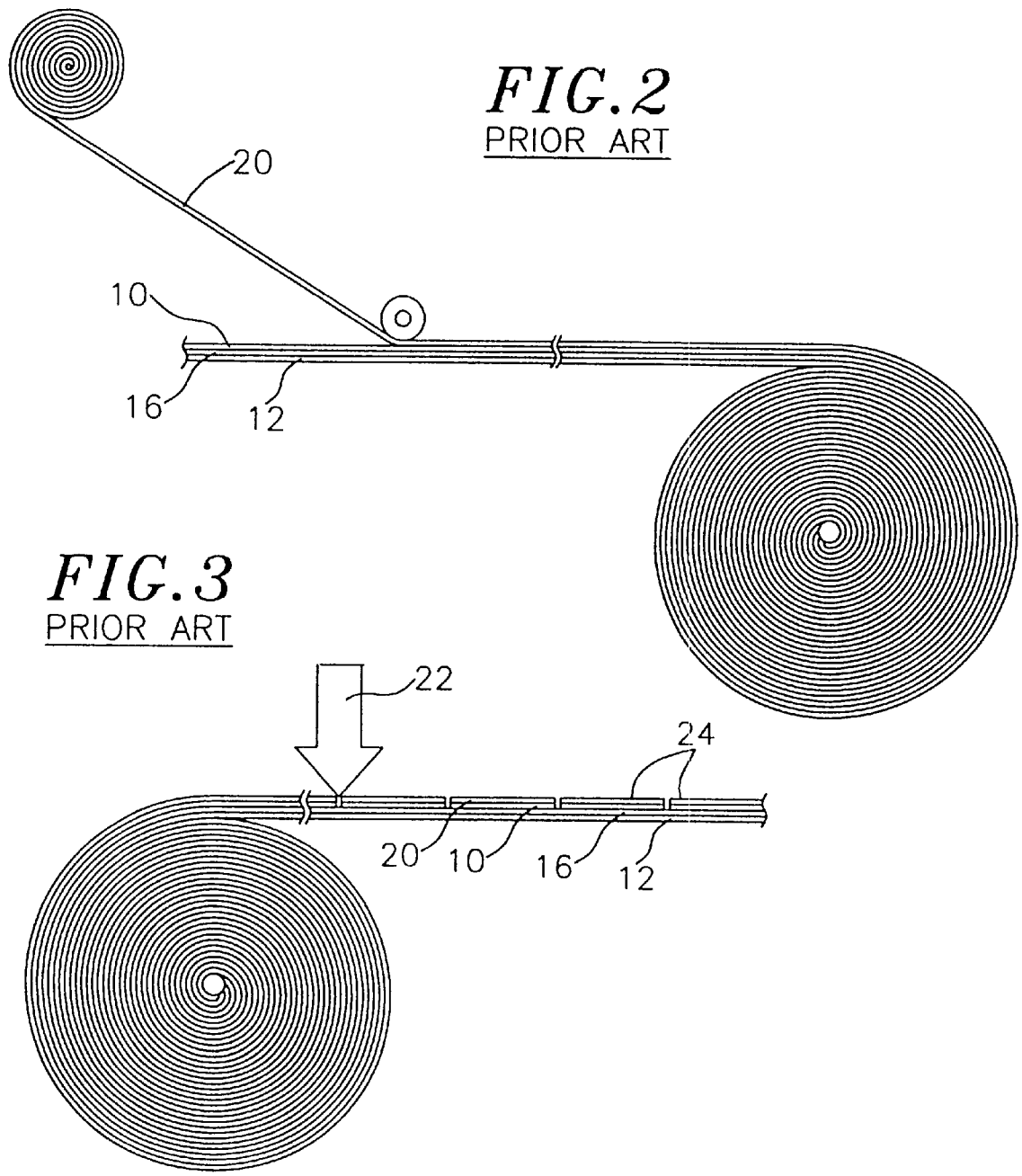

PRELAMINATE PRESSURE-SENSITIVE ADHESIVE CONSTRUCTIONS

CROSS-REFERENCE TO RELATED APPLICATION

This patent application is a divisional of U.S. patent application Ser. No. 08/999,525, filed Sep. 26, 1997, now abandoned which claims benefit of U.S. Provisional Patent Application Ser. No. 60/026,819 filed on Sep. 27, 1996.

FIELD OF THE INVENTION

The present invention relates to pressure-sensitive adhesive constructions and methods for making the same and, more particularly, to prelaminate pressure-sensitive adhesive constructions having a detackified surface to provide anti-blocking characteristics for facilitating subsequent handling and/or treatment of the construction before lamination to a second substrate.

BACKGROUND OF THE INVENTION

Pressure-sensitive adhesive (PSA) constructions such as labels, tapes, decals and the like are known in the art. For example, PSA label constructions are commonly used to apply a particular face stock having a specific nature of printing to an object or article, and are especially useful where objects having low surface energies are to be labeled. PSA label constructions typically comprise a face stock, a liner, and a PSA layer interposed between the face stock and liner.

In accordance with well known practice in the industry, the liner may be coated with a releasable material, forming a release liner. The releasable surface of the release liner may be coated with a layer of PSA for subsequent transfer of the adhesive to the face stock with which the release liner is employed. When the face stock is combined with the release liner, the adhesive is laminated to the face stock. Alternatively, the adhesive may have been directly coated on or combined with the face stock prior to combining the face stock with the release liner. In either approach, in a later step the release liner is removed from the PSA and face stock construction to expose the adhesive, which remains permanently joined to the face stock.

Thus, as indicated in FIG. 1, a PSA 10 may be applied to the release surface of the release liner 12 at a station 14 following drying or curing of a release coat 16 previously applied to the release liner at station 18. This may be a tandem coating operation, or the adhesive coating 10 may be applied on a separate coating line. The PSA may be formed from a material that requires drying before application of the face stock, in which case the face stock is applied to the dried PSA layer. In some cases the release surface 16 is precoated onto the release liner 12, and the adhesive 10 is applied at a later time prior to laminating the release liner 12 to a face stock 20. The combining of the release liner and face stock is diagrammatically illustrated in FIG. 2.

Most commonly, the resulting laminated construction takes the form of a continuous ribbon or web that is collected on a roll. This roll may be transported to a converter for further operations such as printing, die cutting, and matrix stripping, in order to create labels, signs, or other PSA products. Thus for example, FIG. 3 illustrates the die cutting of the face stock 20 at a station 22 into a series of PSA labels 24 of desired shape and size, carried by the release liner 12.

The manufacturing processes described above share the characteristic that the lamination of the release liner, PSA, and face stock occur at a common production facility. To promote flexibility in the production of PSA constructions, it is desired to devise a method for coating the release liner with a PSA (thereby forming a "prelaminate construction") in a separate and independent operation from laminating the prelaminate construction to face stock. These operations should be capable, for example, of allowing the prelaminate construction to be produced at a different geographic location, or in a separate and independent production line, than that at which the prelaminate construction is laminated to the face stock.

One way in which this desire has been addressed has been to make PSA constructions having a subsequent layer of material applied to the exposed surface of the adhesive in an effort to detackify the adhesive surface. Detackifying the PSA construction in such manner has been thought to be an effective way of forming a nonblocking PSA construction that, in theory, would permit the prelaminate PSA construction to be rolled upon itself and stored or transported for subsequent lamination without adhering to a backside surface of the construction, or to anything else. In practice, however, detackified PSA constructions known in the art have not been entirely effective at providing a completely nonblocking construction.

As used herein, the term "nonblocking" is intended to mean that the prelaminate PSA construction is capable of preventing any significant bonding or adhering to contiguous layers of the label construction, i.e., the backside surface of the release liner, during storage, transportation and handling of the construction so that the removal or separation of the prelaminate PSA construction from contiguous layers of the construction, when collected and/or stored in sheet or roll form, will not be impaired.

For example, U.S. Pat. No. 4,135,033 discloses a two-layer adhesive coating having a dry, nontacky surface that is convertible to a permanently adhesive surface by application of heat over a period of ten seconds. The two-layer adhesive coating can be used with silicone treated release paper. In manufacturing PSA constructions it is desired that the step of heating and laminating the PSA construction be completed quickly to maximize the web speed and, thereby maximize manufacturing efficiency. The need to heat activate such nontacky surface over the relatively long period of ten seconds is contrary to the goal of achieving manufacturing efficiency, and thus is not economically practical.

Additionally, in practice it is known that the patented two-layer adhesive coating is not effective at forming a completely nonblocking PSA construction, thereby permitting adhesional interference to occur between contiguous PSA construction surfaces. Such blocking is believed to be caused by the failure of nontacky surface to form a completely continuous film to cover the underlying adhesive layer.

U.S. Pat. No. 3,843,480 discloses a process for preparing a surface-detack layer on a PSA that is carried releasably upon a supporting release liner. The process includes the steps of applying a PSA layer onto a release liner and dusting a surface portion of the PSA layer with a mineral powder to detackify the PSA layer. The resulting detackified PSA layer is said to permit the prelaminate construction to be wound upon itself or sheeted and stacked without adhesional interference. However, in practice it is known that such patented prelaminate constructions are not completely effective at preventing blocking, as adhesional interference between contiguous construction layers is known to occur. A reason for such blocking is believed to be the failure of the mineral powder to form a continuous PSA covering film.

The surface detack layer of such patented construction is subsequently attached to another substrate surface, such as printing paper and the like, by a single process step of simultaneously heating the surface of both the detack layer and the printing paper, while applying pressure to the printing paper and heated detack layer to form a completed laminate construction.

Simultaneous heat activation of the detack layer and pressure lamination, however, is problematic because it limits the types of substrate materials that can be used. For example, thermally-sensitive substrates such as thermal print paper, films of polymers having a low glass transition temperature, and oriented polymer films cannot be used with this process because the step of heating such substrates is known to adversely impact the desired performance of these materials.

The need to simultaneously heat activate and laminate the PSA construction is also not desired because of the related problems that are known to occur at the nip, such as wrinkling and buckling of the laminated construction that is caused by the different coefficients of expansion between the prelaminate PSA construction and the laminated substrate. Additionally, simultaneous heat activation and lamination is also known to cause shrinkage in paper face stocks due to the loss of water that occurs during such heat exposure, which is known to cause curling and the like. Simultaneous heat activation and lamination can also cause the outgassing of steam or other vapors in the nip, which is known to result in bubble formation at the nip and produce a laminate construction having areas of poor anchorage.

U.S. Pat. No. 3,343,978 discloses an adhesive structure comprising a flexible substrate, a PSA in contact with the substrate, and a nontacky layer adhering to the surface of the PSA. The nontacky layer can be formed from a material that is subsequently heat activated to form a second tacky layer, which is simultaneously heat laminated to a desired first article. The flexible substrate is removed to expose the PSA, which is placed into contact with a desired second article.

Again, the need to heat laminate the first article to an activated tacky layer, when using a heat activatable nontacky layer, limits the types of first articles capable of being used with the adhesive structure to those that are not affected by exposure to high temperatures, and introduces the numerous problems described above that are encountered during heated lamination.

U.S. Pat. No. 3,027,271 discloses a PSA composite comprising a face stock, a PSA tacky layer deposited onto the surface of the face stock, and a dry powder layer deposited onto the surface of the PSA tacky layer. The dry powder is intended to detackify the underlying PSA tacky layer and, in theory, allow the face stock material to be stored or stacked without sticking to itself The dry powder layer is formed from dry particles that are removable upon application of heat by vaporization or decomposition into gaseous products, thereby exposing the underlying tacky layer for application of the composite at the point of use.

As discussed above with reference to the construction described in U.S. Pat. No. 3,843,480, the use of a dry powder in this patented composite also fails to provide a completely nonblocking PSA composite, thereby permitting adhesional interference to occur between contiguous surfaces of the PSA composite. The reason for this is believed to be the failure of the dry powder layer to form a continuous PSA covering film.

Having to heat the composite to remove or vaporize the dry powder layer and expose the PSA tacky layer, again limits the type of face stocks that can be used to form the composite to those not affected by exposure to high temperatures. Additionally, the patented composite that is disclosed is one that includes a face stock and, therefore, does not address the desire to provide a face stock-free prelaminate PSA construction.

It is, therefore, desired that prelaminate PSA constructions be designed and manufactured to have nonblocking properties enabling such prelaminate PSA constructions to be collected in roll form or the like and stored without adhering to contiguous layers for subsequent lamination to a substrate. It is desired that prelaminate PSA constructions be capable of being activated in a relatively short amount of time prior to lamination with a substrate to maximize manufacturing efficiency. It is also desired that prelaminate PSA constructions be capable of facilitating lamination at temperature conditions that do not limit the types of laminating substrate that can be used, and that avoid problems known to occur during heated lamination. It is further desired that the prelaminate PSA construction be capable of facilitating lamination without the emission or use of potentially dangerous or harmful gases or chemicals.

Additionally, it is desired to provide a process for adhesively activating and later laminating a prelaminate construction to a substrate. Such process should avoid the problems of heated lamination, and should afford manufacturing flexibility. For example, such process should permit the insertion or application of an additional layer or structure after adhesive activation and before lamination to the substrate; and should allow the lamination of a variety of types of flexible substrates to the adhesively activated prelaminate construction.

SUMMARY OF THE INVENTION

There is provided in the practice of this invention, prelaminate PSA constructions manufactured without second substrates, e.g., face stocks, that introduce manufacturing flexibility into the process of making laminated PSA constructions. Prelaminate PSA constructions of this invention are nonblocking, thereby eliminating the possibility of adhesive interference occurring between the prelaminate PSA construction and a contiguous surface. Prelaminate PSA constructions of this invention are activatable in less than about five seconds to permit subsequent lamination to a second substrate at a temperature less than about 100° C., i.e., a temperature significantly below a heat activation temperature.

Prelaminate PSA constructions of this invention comprise, a first substrate having a layer releasable material disposed thereon, a PSA layer disposed on the layer of releasable material, and a detackified layer (DL) disposed on a surface of the PSA layer. The DL can be formed from, in first and second construction embodiments, a detackifying material that is activatable to form a tacky layer on top of the PSA layer; and in a third construction embodiment, from a detackifying material that is activatable to migrate into the PSA layer and reveal the PSA layer tacky surface. Preferred first and third embodiment detackifying materials are heat activatable, while preferred second embodiment detackifying materials are chemically activatable. In each instance the tacky surface is provided to accommodate subsequent lamination to a second substrate for forming a laminated PSA construction.

Prelaminate PSA constructions of this invention are completely nonblocking to a minimum 24 hour blocking temperature of at least 50° C. at a pressure of about 40 kilopascals (kPa). The nonblocking characteristics of the prelaminate PSA construction permits lamination to occur either: (1) after the step of manufacturing the prelaminate PSA construction during the same process operation; (2) after the step of manufacturing the prelaminate PSA construction during a separate process operation at the same geographic location; or (3) after the step of manufacturing the prelaminate PSA construction during a separate process operation at a different geographic location.

Laminated PSA constructions of this invention, prepared from first and second embodiment prelaminate PSA constructions, comprise a first flexible substrate having a layer of releasable material disposed thereon, a layer of PSA disposed on the layer of releasable material, a DL disposed on a surface of the PSA layer, and a second substrate laminated to a surface of the DL. Laminated PSA constructions formed from first embodiment prelaminate PSA construction have improved properties of structural rigidity and shear when compared to conventional laminated PSA constructions that do not include the DL. For this reason, the DL in such embodiment is a reinforcing material.

Furthermore, the DL of the first and second embodiment prelaminate PSA constructions acts as a barrier to prevent the migration of low-molecular weight species from the pressure sensitive adhesive to the second substrate, which can stain the second substrate.

Laminated PSA constructions of this invention, prepared from a third embodiment prelaminate PSA construction, comprises a first flexible substrate having a layer of low-release material disposed thereon, a layer of PSA disposed on the layer of low-release material that includes detackifying material constituents disposed therein, and a second substrate laminated to a surface of the PSA layer.

Prelaminate PSA constructions of this invention: (1) introduce flexibility into the process of manufacturing PSA construction by allowing the prelaminate PSA constructions to be stored, handled or transported before lamination, thereby eliminating the need to laminate immediately after PSA formation; (2) permit lamination at low or ambient process temperature conditions, thereby maximizing the type of substrates that can be used with the construction and eliminating problems that are otherwise known to occur during heated lamination; and (3) enhance the physical properties of the laminated PSA construction.

DESCRIPTION OF THE DRAWINGS

These and other features and advantages of the present invention will become appreciated as the same becomes better understood with reference to the specification, claims and drawings wherein:

FIG. 2 is a semi-schematic side elevation of a method of applying a face stock to the PSA construction in FIG. 1 to form a laminated PSA construction;

FIG. 3 is a semi-schematic side elevation of a conventional method of converting the laminated PSA construction produced in FIG. 2;

DETAILED DESCRIPTION OF THE INVENTION

The present invention is directed to prelaminate PSA constructions which do not include a second substrate, e.g., a face stock and the like, and which comprise a first flexible substrate, a coating of release material disposed on a surface of the flexible substrate, a pressure-sensitive adhesive disposed on the coating of release material, and a DL deposited onto a surface of a pressure-sensitive adhesive layer. Prelaminate PSA constructions of this invention are nonblocking, thereby facilitating storage, handling, and transportation of the construction, and providing flexibility in the process of manufacturing laminated PSA constructions therefrom.

Prelaminate PSA constructions of this invention are designed to facilitate subsequent lamination to a desired second substrate at temperature conditions significantly below that used for activation of the construction, e.g., at ambient to subactivation process temperatures, without the need to heat the substrate or heat the nip during lamination. The ability to laminate at such temperature conditions maximizes the different types of substrates that can be used with prelaminate PSA constructions of this invention.

Figure 1:
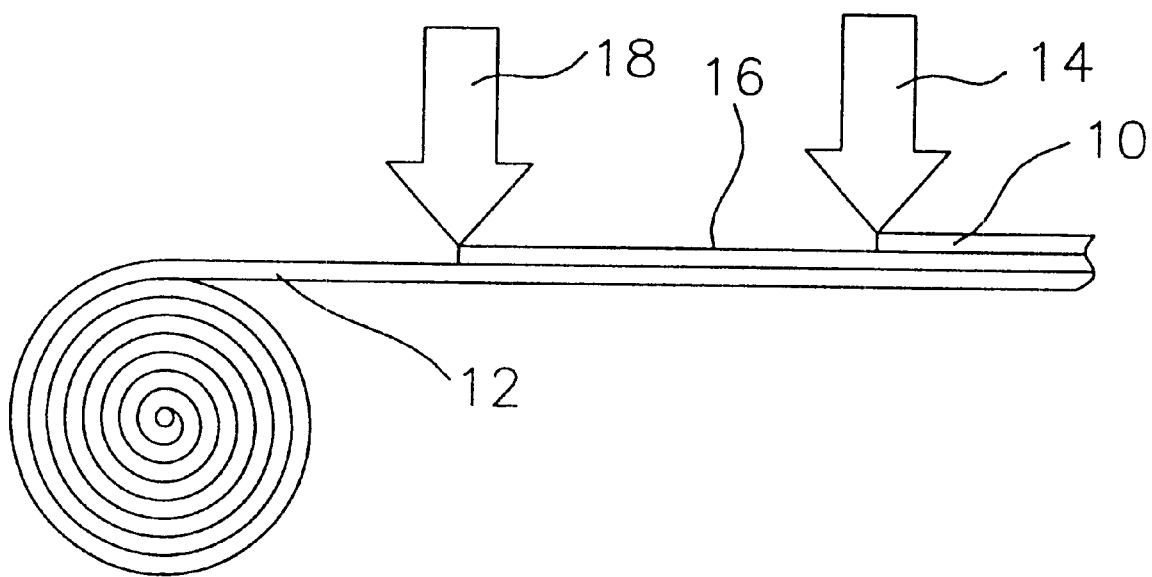
FIG. 1 is a semi-schematic side elevation of a method of manufacturing a conventional PSA construction.
Figure 4:
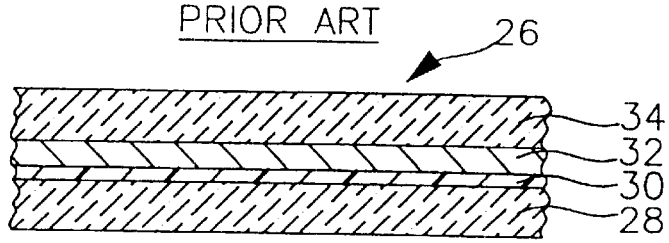
FIG. 4 is a cross-sectional side elevation of a conventional PSA label construction.

Prelaminate PSA constructions of this invention offer many advantages over conventional PSA constructions, such as conventional PSA label constructions illustrated in FIG. 4. With reference thereto, a conventional PSA label construction 26 comprises a liner 28 having disposed thereon a coating of release material 30, forming a release liner. A PSA layer 32 is disposed on the coating of release material 26. A face stock 34, in sheet stock or roll stock form, is disposed on a surface of the PSA layer 32.

In a conventional PSA label construction, comprising the release liner 28, coating of release material 30, and PSA layer 32, is manufactured and laminated together with the face stock 34 during a single process, e.g., by a roll coating and lamination process or by a die coating and lamination process. The completed or laminated PSA label construction is distributed to a converter where it is printed, cut and stripped, e.g., by die cutting and matrix stripping methods as described above, to form the desired shape and size label. It is to be understood that the converting operation may proceed differently than that described above, depending on the particular PSA label application. For example, the converting step may include the steps of cutting and stripping that is followed by the step of printing.

For purposes of increasing manufacturing flexibility, prelaminate PSA constructions of this invention allow for a prelaminate PSA construction to be manufactured independent of subsequent lamination with a substrate, thereby permitting PSA construction lamination to occur either: (1) after the step of manufacturing the prelaminate PSA construction during the same process operation; (2) after the step of manufacturing the prelaminate PSA construction during a separate process operation at the same geographic location; or (3) after the step of manufacturing the prelaminate PSA construction during a separate process operation at a different geographic location.

Figure 5:
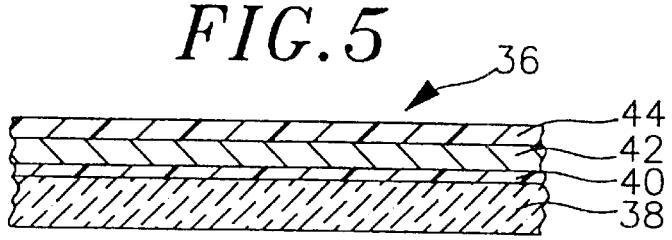
FIG. 5 is a cross-sectional side elevation of first, second and third embodiments of prelaminate PSA constructions prepared according to principles of this invention.

With reference now to FIG. 5, an exemplary embodiment of a prelaminate PSA construction 36, prepared according to principles of this invention, includes a first substrate 38 and a coating of release material 40 disposed on a surface of the first substrate 38. It is to be understood that the first substrate may be in the form of any material suitable to act as a carrier for the construction. Preferred first substrates include flexible materials that are selected from the group of stocks selected from sheet stock and roll or web stock. A particularly preferred first substrate is a web stock in the form of a liner having a release material disposed thereon, thereby forming a release liner. A particularly preferred release liner is one that is commercially available from, for example, Rhinelander Paper of Rhinelander, Wisconsin under the product name Rhi-Liner 12, that has a thickness of about 65 micrometers and has a 42 pound basis weight.

Suitable release materials include those materials with a low surface free energy that have a low affinity for the PSA, thereby allowing the PSA to be peeled away without cohesive failure. Preferred release materials are selected from the group of silicone-containing materials. A particularly preferred silicone-containing material for forming the coating of release material is commercially available from, for example, General Electric Silicones of Waterford, N.Y. under the product name GE 6000.

A layer of PSA 42 is disposed on a coating of release material 40, and a DL 44 is disposed on a surface of the PSA layer 42. The PSA layer 42 has a body portion and has a surface portion that is oriented immediately adjacent the DL 44. The DL 44 acts to detackify the underlying PSA layer 42, thereby forming a nonblocking prelaminate PSA construction that enables subsequent handling or treatment of the construction without it adhering to itself or to any other adjacent surface.

There are three prelaminate PSA constructions that are prepared according to principles of this invention. Each prelaminate PSA construction embodiment comprises an outermost DL that renders the construction completely nonblocking until it is activated to facilitate lamination. A first embodiment prelaminate PSA construction comprises a DL that is formed from a detackifying material that is capable of being heat activated to form an activated tacky layer on top of the PSA layer to facilitate lamination. A second embodiment prelaminate PSA construction comprises a DL that is formed from a detackifying material that is capable of being chemically activated to form an activated tacky layer on top of the PSA layer to facilitate lamination. A third embodiment prelaminate PSA construction comprises a DL that is formed from a detackifying material that is capable of being heat activated to migrate into the PSA layer to expose the underlaying tacky PSA surface to facilitate lamination.

The DL that is applied to the PSA layer is in the form of a continuous film that completely covers the underlying PSA layer, and renders the prelaminate PSA construction completely nonblocking. Prelaminate PSA constructions of this invention are known to be nonblocking up to a minimum temperature of at least 50° C., and in some instances up to about 70° C. for a 24 hour period under a pressure of about 40 kPa, as will be discussed in greater detail below.

It is important that prelaminate PSA constructions of this invention display such nonblocking characteristics to facilitate removing or separating the collected and/or stored prelaminate PSA construction from contiguous layers after it has been manufactured without causing the release liner to be pulled free of the PSA layer. The use of the release material on the release liner allows the release liner to be easily removable from the PSA layer to facilitate attachment of the completed, i.e., laminated, PSA construction to a desired article. Adhesive interference or blocking between the DL and an adjacent backside surface of the release liner is not desired because it results in the release liner being pulled away from the PSA layer during the removal or separation operation, thereby rendering the prelaminate PSA construction useless.

Figure 6:
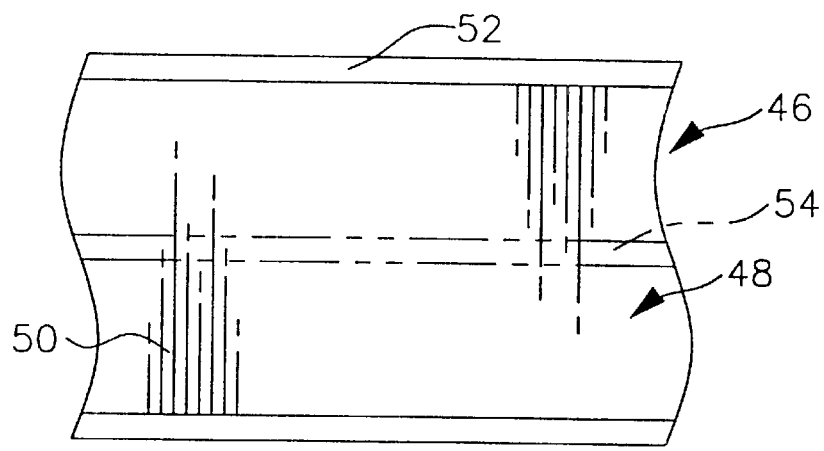
FIG. 6 is a top plan elevation of a prelaminate PSA subconstruction comprising a release liner having a patterned layer of low-release material.

If desired, the release liner may be patterned to avoid the possibility of the PSA layer lifting away from the lengthwise edges of the formed and collected PSA construction, and thereby interfering with the payout of the prelaminate PSA construction during the activation and lamination operation by adhering to the adjacent backside surface of the release liner. Referring to FIG. 6, in an alternative embodiment of the prelaminate PSA construction 46, the release liner 48 is patterned so that the coating of release material 50 is not deposited along each lengthwise edge 52. The distance that each patterned portion extends away from a respective lengthwise edge and across the width of the release liner depends on the particular application. In an exemplary embodiment, a patterned portion extending up to about three millimeters from the lengthwise, i.e., machine direction, edge has proven adequate.

Additionally, in the event that the prelaminate PSA construction is to be slit lengthwise after formation to form two or more different rolls, it may be desired that the release liner also be patterned along the slit point(s), as shown by 54, to prevent subsequent PSA layer lifting along the newly-formed lengthwise edges.

It is desired that the DL be formed from detackifying materials that are capable of being used with a variety of conventional PSAs, including silicone-based PSAs, rubber-based PSAs, and acrylic-based PSAs. PSAs useful in forming prelaminate PSA constructions of this invention include those that are conventionally used in forming PSA constructions, such as rubber-based, silicone-based, and acrylic-based PSAs. Preferred adhesives systems are described in detail in U.S. patent application Ser. No. 07/755,585 filed Sep. 3, 1991, abandoned on Sep. 25, 1992, and incorporated herein by reference.

PSAs useful in forming prelaminate PSA constructions according to principles of this invention can include:

S-246—A hot melt rubber based PSA that is manufactured by the Fasson Division of Avery Dennison Corporation.

S-490—An acrylic emulsion PSA that is manufactured by the Chemicals Division of Avery Dennison Corporation.

Some adhesives often contain low-molecular weight species which are liquid at room temperature. With respect to forming third embodiments of prelaminate PSA constructions of this invention, i.e., prelaminate PSA constructions comprising a heat activatable detackifying material having constituents that migrate into the PSA layer, it is preferred to keep these materials to a minimum concentration. Low-molecular weight species include residual monomers, liquid tackifiers, liquid plasticizers and the like which tend to exude during storage and can pass through the DL 44, bloom and stain an adjacent second substrate laminated thereto. Materials that bloom can also cause undesirable blocking and adversely affect release from first substrate 38.

For acrylic adhesives, residual monomers are frequently encountered, which can be especially problematic since they tend to have low odor thresholds and, in some cases, behave as irritants.

In rubber-based hot melt PSAS, usually in addition to solid tackifiers, liquid plasticizers and liquid tackifiers are used. Tackifiers increase glass transition temperature and plasticizers reduce glass transition temperature. Both act to modify tack and wet out. It is desired that adhesives useful in forming third embodiments of prelaminate PSA constructions of this invention not have large amounts of these liquid plasticizers and tackifiers.

The layer of PSA material can be applied to the first substrate for example in the form of a hot melt, an emulsion or aqueous dispersion, as a solvent solution, or as a film membrane. The method that is used to apply the PSA material depends on the physical form of the PSA, and can include spray, roll, and die application methods. In preferred embodiments, the PSA material is applied in the form of a hot melt, solution, or emulsion by die application method. As will be discussed below, multi-die application methods can be used to simultaneously apply the PSA material along with the DL.

The type of detackifying material that is selected to form the DL may vary depending on the type of material that is used to form the PSA layer, and/or the type of second substrate to be laminated. For example, for a third embodiment prelaminate PSA construction that is activated by migration of detackifying material constituents into the PSA layer, it is desired that the selected detackifying material have a solubility parameter that complements and is compatible with the solubility parameter of the PSA material. Such compatibility between the PSA and DL is needed to facilitate migration of detackifying material constituents into the body of the PSA during activation, thereby exposing the underlying tacky surface of the PSA.

In contrast, for first and second embodiment a prelaminate PSA constructions comprising a DL that is activated to form a second tacky layer, it is desired that the detackifying material have a solubility parameter that is inconsistent or incompatible with that of the PSA. Such incompatibility is needed to ensure that the detackifying material does not migrate into the PSA during activation.

Different methods can be used to apply the DL to the surface of the PSA layer, depending on the type of detackifying material that is selected. Generally speaking, the methods described above for applying different forms of the PSA material can also be used to apply the same forms of the detackifying material. For example, detackifying materials in the form of aqueous dispersions can be applied by roll coating, spray coating or Meyer rod process; detackifying materials in the form of a solution or emulsion can be applied by die, spray, or roll process; and detackifying materials in the form of a hot melt can be applied by roll, spray or die process.

If desired, the application methodology used for the DL can be independent of both the detackifying material chemistry and the particular method employed to apply the PSA layer. However, for purposes of manufacturing efficiency, it may be desirable to use a detackifying material that is in the same form as the PSA material so that the same application methodology can be used for each. For example, when the PSA is in the form of a hot melt or a solution that is applied by die process, it may be desired that the detackifying material also be in the form of a hot melt or solution to facilitate its application by a die process, e.g., by multi-die process.

It is desired that the detackifying material be capable of being activatable to ready the prelaminate PSA construction for subsequent lamination with a second substrate. As referred to throughout this application, the term "activation" generally refers to the process of preparing the prelaminate PSA construction for lamination to the second substrate by forming a tacky surface. As described in greater detail below, this process may involve transforming the DL itself into a second tacky layer on top of the PSA layer, or may involve the migration of detackifying constituents from the DL to the PSA layer body to expose the underlying PSA layer tacky surface.

Depending on the type of detackifying material that is selected, prelaminate PSA constructions prepared according to principles of this invention can be activated by exposing the DL to: (1) heat by conductive, convective or radiative heat transfer means; or to (2) chemicals, such as solvents and the like.

Figure 7:
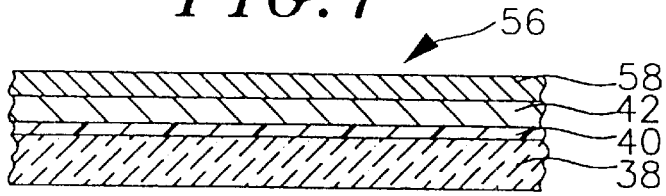
FIG. 7 is a cross-sectional side elevation of first and second embodiment prelaminate PSA constructions after activation.

FIG. 7 illustrates an activated first and second embodiment prelaminate PSA construction 56, prepared according to principles of this invention, that includes a DL that is activatable to itself form a second tacky layer 58 on top of the PSA layer 42 surface. In these embodiments it is not necessary that the materials selected to form the DL and PSA layer each have a complementary solubility parameter because it is not necessary that detackifying material constituents migrate or pass into the PSA body. It is, however, desirable that the detackifying material have a chemistry that is both capable of forming an independent adhesive surface and is compatible with the PSA layer during the activation process to form a strong interface or bond thereto.

First embodiment prelaminate PSA constructions prepared according to principles of this invention include a DL that is formed from a detackifying material that is heat activatable, while second embodiment PSA constructions include a DL that is formed from a detackifying material that is chemically activatable, e.g., activatable through use of a solvent.

Figure 8:
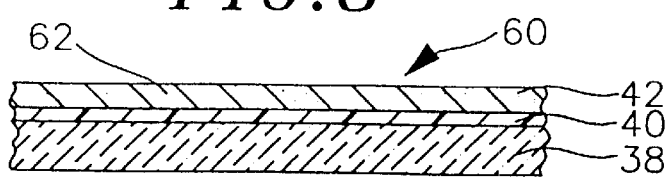
FIG. 8 is a cross-sectional side elevation of a third embodiment prelaminate PSA construction after activation.

FIG. 8 illustrates an activated third embodiment of a prelaminate PSA construction 60, prepared according to principles of this invention, that included a DL that was activatable to cause constituents 62 of the detackifying material to migrate into the body of the underlying PSA layer 42 to expose the tacky surface of the PSA layer and, thereby ready the construction for subsequent lamination with a second substrate. In such embodiment, it is desired that the detackifying material be in the form of a heat activatable non-staining coating which does not display a tendency to migrate with time into the body of the PSA layer 42 until it is raised to an elevated temperature which is sufficient to cause permanent migration into the body of the PSA.

Upon sufficient heating, the detackifying material of the third embodiment migrates into the body of the PSA, leaving little or no residue at the surface of the PSA and, thereby allows the adhesive to recover all or a substantial portion of its inherent pressure-sensitive adhesive properties to facilitate lamination with a second substrate.

As discussed above, suitable techniques for applying the DL onto the surface of the PSA layer include roll, spray, Meyer rod, electrostatic, and die process depending on the particular form of the detackifying material as mentioned above. The application techniques generally fall into the category of either being a multi-step coating process, e.g., application of first the PSA layer and then the DL, or a single-step process, e.g., application of the PSA and DL together. In the multi-step process, the DL can be applied to the surface of the PSA layer, after the PSA has been applied to the coating of release material on the release liner, in the form of a hot melt, aqueous dispersion, or solution by roll, spray, electrostatic, or die process. In the single-step process, die technology is preferably used to apply the DL onto the PSA layer simultaneously with applying the PSA layer onto the coating of release material, in the form of a solution, emulsion or hot melt.

Figure 9:
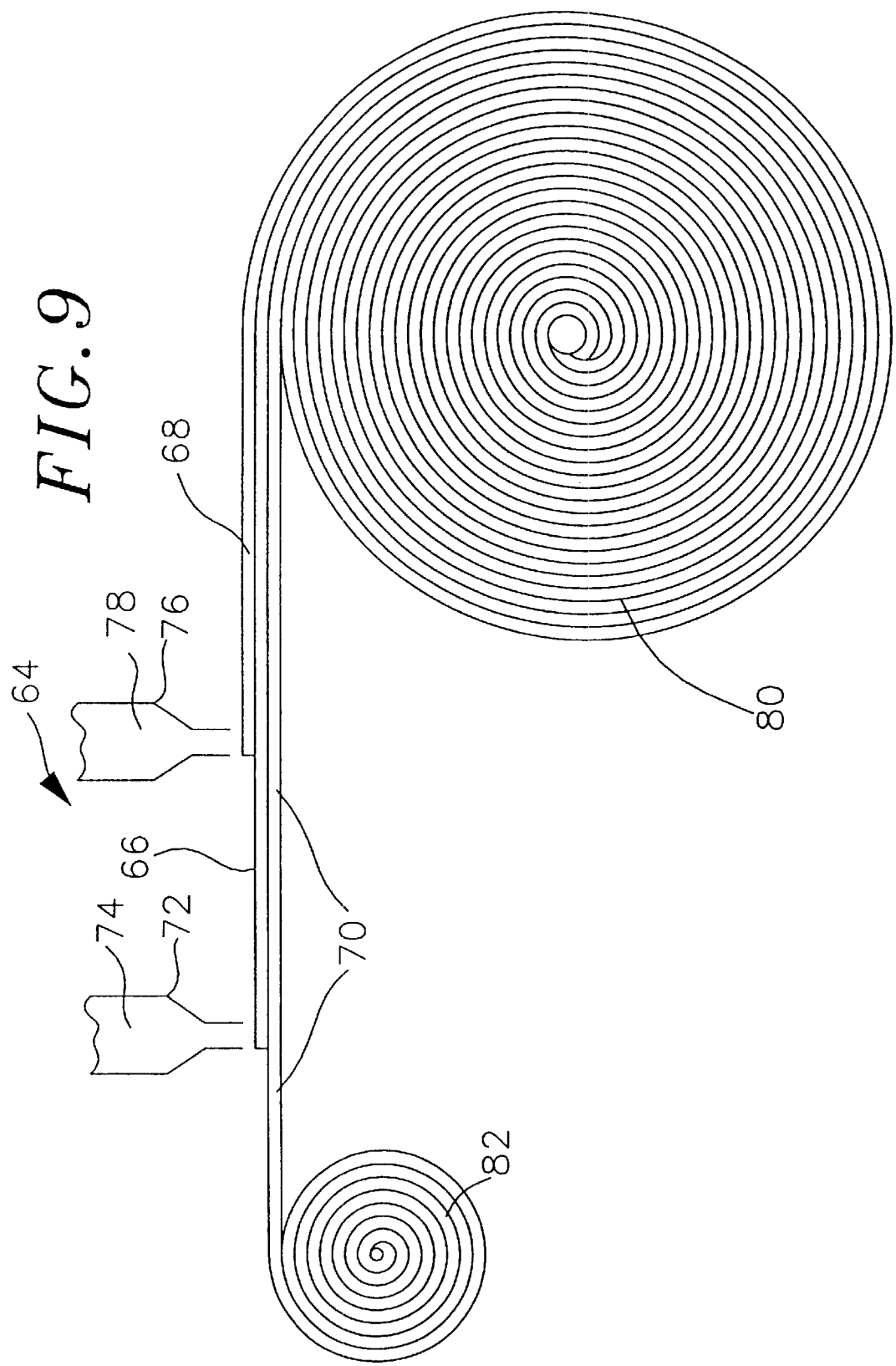
FIG. 9 is a semi-schematic side elevation of a first method of manufacturing prelaminate PSA constructions of this invention.

An exemplary method of applying the PSA layer and DL onto a first substrate in the form of a web stock by a multi-step die or tandem die process 64 is illustrated in FIG. 9, where the PSA layer 66 is applied in the form of a solution, emulsion or a hot melt, and the DL 68 is subsequently applied to the PSA layer 66 as a solution, emulsion or a hot melt. This method is illustrative of one that can easily be implemented using existing PSA coating equipment to permit subsequent application of the DL. The PSA layer 66 is applied to the coating of release material on the release liner 70 by a PSA coating station 72, which contains a volume of PSA material 74. A DL coating station 76 is disposed downstream from the PSA coating station 72 and comprises a volume of detackifying material 78 for depositing onto the PSA layer 66.

In the event that the PSA layer and DL are each applied in the form of a hot melt, it may be desirable that a cooling platen (not shown) or the like be placed between the PSA coating station 72 and the DL coating station 76, to cool the PSA layer 66 to prevent migration of the applied detackifying material therein. It may also be desirable to place a cooling platen (not shown) or the like after the DL coating station 76 to cool the DL 68 to ensure that it is tack free before the prelaminate PSA construction is wound on a collection roll 80.

In the event that both the PSA layer and DL are applied in the form of a solution or emulsion, it may be desirable to place an evaporator (not shown) or the like between the PSA coating station 72 and the DL coating station 76, to drive the solution out of the PSA layer to prevent bubble formation after application of the detackifying material. It may also be desirable to place an evaporator (not shown) or the like after the DL coating station 76 to drive the evaporatable species out of the DL 68 before the prelaminate PSA construction is wound on the collection roll 80.

As a continuous roll of the release liner 70 is unwound or dispersed from a pay out roll 82, the PSA coating station 72 deposits a predetermined thickness of PSA material 74 onto the coating of release material on the release liner 70, forming a PSA layer 66 thereon. The DL coating station 76 deposits a predetermined thickness of the detackifying material 78 onto the surface of the PSA layer 66, as the prelaminate PSA subconstruction travels in a continuous web through the DL coating station 76, forming a DL 68 thereon.

In an exemplary embodiment, the PSA layer 66 has a coat weight in the range of from about 5 to 125 grams/square meter ($g/m^2$), or has a thickness in the range of from about 5 to 125 micrometers assuming a PSA density of about one. It is desired that the DL 68 have a coat weight in the range of from about 0.5 to 100 $g/m^2$ (0.5 to 100 micrometers thickness assuming a density of about 1), where a preferred DL coat weight is in the range of from about 1 to 50 $g/m^2$ (1 to 50 micrometers thickness), and where a most preferred DL coat weight is in the range of from about 1 to 20 $g/m^2$ (1 to 20 micrometers thickness). It is to be understood that the coat weight and layer thickness of both the PSA and detackifying material may vary depending on the particular prelaminate PSA construction application. A DL having a coat weight and/or thickness in the desired range provides a desired degree of protection against adhesion between the PSA layer and an adjacent backside surface of a release liner when in the stored position, and can be easily and efficiently processed during activation to either migrate into the underlying PSA layer or itself form a second tacky layer to provide a desired degree of adhesion for supporting a second substrate. If desired, the coat weight and/or thickness of either the DL or PSA layer can be metered by use of a Meyer rod that can be placed after each respective coating station.

To ensure accurate monitoring of the thickness of the DL, ultraviolet (UV) chromophores can be added to the detackifying material to allow visual observation of coating quality during the application process, and to allow monitoring of the coat weight by on-line use of a combination ultraviolet and radio frequency gauge. A particularly preferred UV chromophore is Leucopure EGM available from Clariant Chemicals.

After the prelaminate PSA construction has passed the DL coating station 72 and the detackifying material 78 has been applied, the prelaminate PSA construction is routed to and is collected on the collection roll 80. When a desired quantity of the prelaminate PSA construction has been manufactured, the collection roll 80 is removed from the process and can be stored for activation and lamination during a separate operation at either the same or at a different geographic location, thereby providing enhanced manufacturing flexibility. Alternatively, rather than being collected, the completed prelaminate PSA construction can be routed for activation and lamination during the same manufacturing operation.

Figure 10:
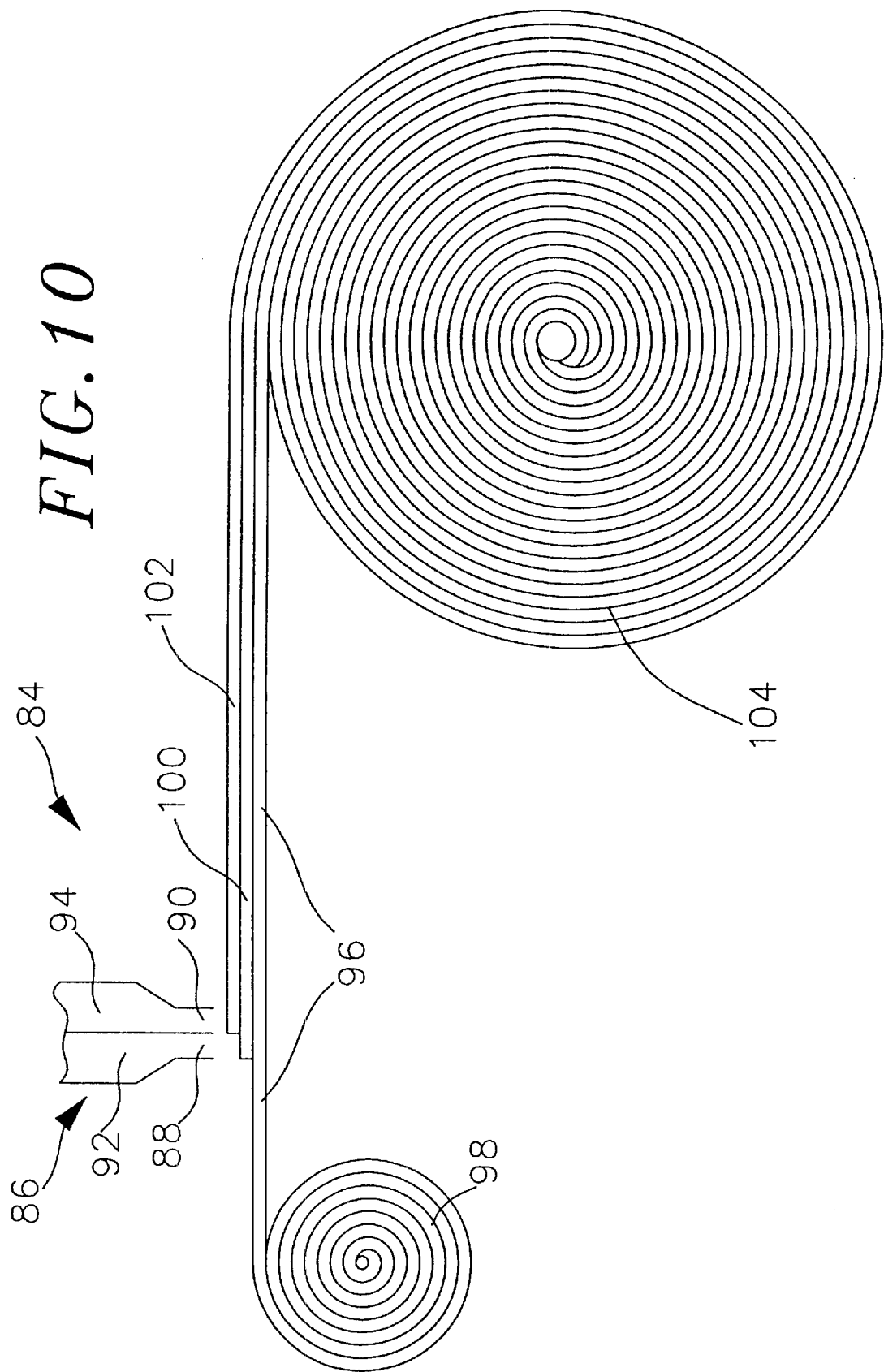
FIG. 10 is a semi-schematic side elevation of a second method of manufacturing prelaminate PSA constructions of this invention.

An exemplary method of applying the PSA layer and DL by a single-step multi-die process 84 is illustrated in FIG. 10. A dual die station 86, comprising a PSA die chamber 88 and a DL die chamber 90, comprises a quantity of PSA material 92 and detackifying material 94 in respective separated compartments. The dual die station 86 is used to deposit both the PSA material and the detackifying material, in the form of either a hot melt, solution or emulsion, simultaneously in one step.

Although FIG. 10 illustrates a single-step multi-die process comprising a dual die station for applying the PSA layer and DL, it is to be understood that the multi-die process may comprise a die station having more than two die compartments, depending on the number of layers to be deposited onto the release liner. Multi-die application methods useful for applying both the PSA layer and the DL are further described in Published PCT International Application Nos. PCT/US95/11807; PCT/US95/11733; PCT/US95/11734; and PCT/US95/11717, which are herein incorporated by reference.

As a continuous roll of the release liner 96 is unwound from a pay out roll 98, the PSA die chamber 88 deposits a thickness of the PSA material 92 onto the coating of release material on the release liner 96, forming a PSA layer 100 thereon. At the same time that the PSA material is being deposited, a thickness of the detackifying material 94 is deposited by the DL die chamber 90 onto the just-formed surface of the PSA layer 100, forming a DL 102 thereon. The completed prelaminate PSA construction is collected on a collection roll 104.

As discussed above, subsequent activation and lamination of the prelaminate PSA construction may occur at the same geographical location where the prelaminate PSA construction was manufactured, or may occur at a different geographical location. Alternatively, rather than being collected, the completed prelaminate PSA construction can be routed for activation and lamination during the same manufacturing operation.

In the event that the PSA layer and DL are applied as a hot melt, a cooling platen (not shown) or the like can be placed between the dual die station 86 and the collection roll 104 to reduce the temperature of the DL 102 to ensure that is tack free before being collected on the collection roll 104, thereby avoiding unwanted sticking to the adjacent backside surface of the release liner.

In the event that the PSA layer and DL are applied as a solution or emulsion, an evaporator (not shown) or the like can be placed between the dual die station 86 and the collection roll 104 to drive off the evaporatable species from the prelaminate PSA construction before being collected on the collection roll 104 to avoid unwanted sticking to the adjacent backside surface of the release liner.

After the prelaminate PSA construction has passed the DL coating station 72 and the detackifying material 78 has been applied thereto, it may be desirable to further heat the DL to ensure that any streaks, surface imperfections or other voids that may have been formed therein and that expose the underlaying PSA layer are removed so that the DL is in the form of a continuous film before being collected. Such further heat treating step is helpful when the DL has a high solids content either during or after its application. A DL applied as a hot melt, by either multi-step or tandem die process, has a solids content of approximately 100 percent. Streaks or other surface imperfections that expose the underlaying PSA layer may be formed in the DL during its application by particulate matter in the die. Because of its high solids content, the detackifying material is unable to readily migrate or flow after it is applied to fill in such streaks or imperfections in the DL. If left untreated, the exposed PSA layer will be allowed to make contact with a backside surface of the release liner when the prelaminate PSA construction is collected on the collection roll.

Contact between the PSA layer and the contiguous release layer backside surface will cause the prelaminate PSA construction to adhere to such backside surface, thereby making the prelaminate PSA construction difficult to unwind and causing the PSA layer to bond permanently to the release layer backside surface. Once the PSA layer is pulled away from its underlaying release layer and is transferred to the backside surface of the contiguous release layer the PSA prelaminate construction is ruined and is unsuited for lamination.

A DL that is applied as a solution or as an emulsion, by either multi-step or tandem die process, will have a solids content of approximately 100 percent after the solvent or emulsifying agent has been evaporated away. Like the hot melt applied DL, the die process that is used to apply a solvent or emulsion DL may also create streaks or other imperfections in the DL that exposes the underlaying PSA layer. Streaks or imperfections in the DL may be formed in solution or emulsion applied DLs when either the DL does not adequately wet the underlying PSA layer, or when the DL becomes dewetted with the underlaying PSA layer during further processing, e.g., during evaporation. If left untreated, the streaks or imperfections could cause a catastrophic failure of the prelaminate PSA construction as discussed above during the unwinding process by PSA layer transferal.

Figure 16:
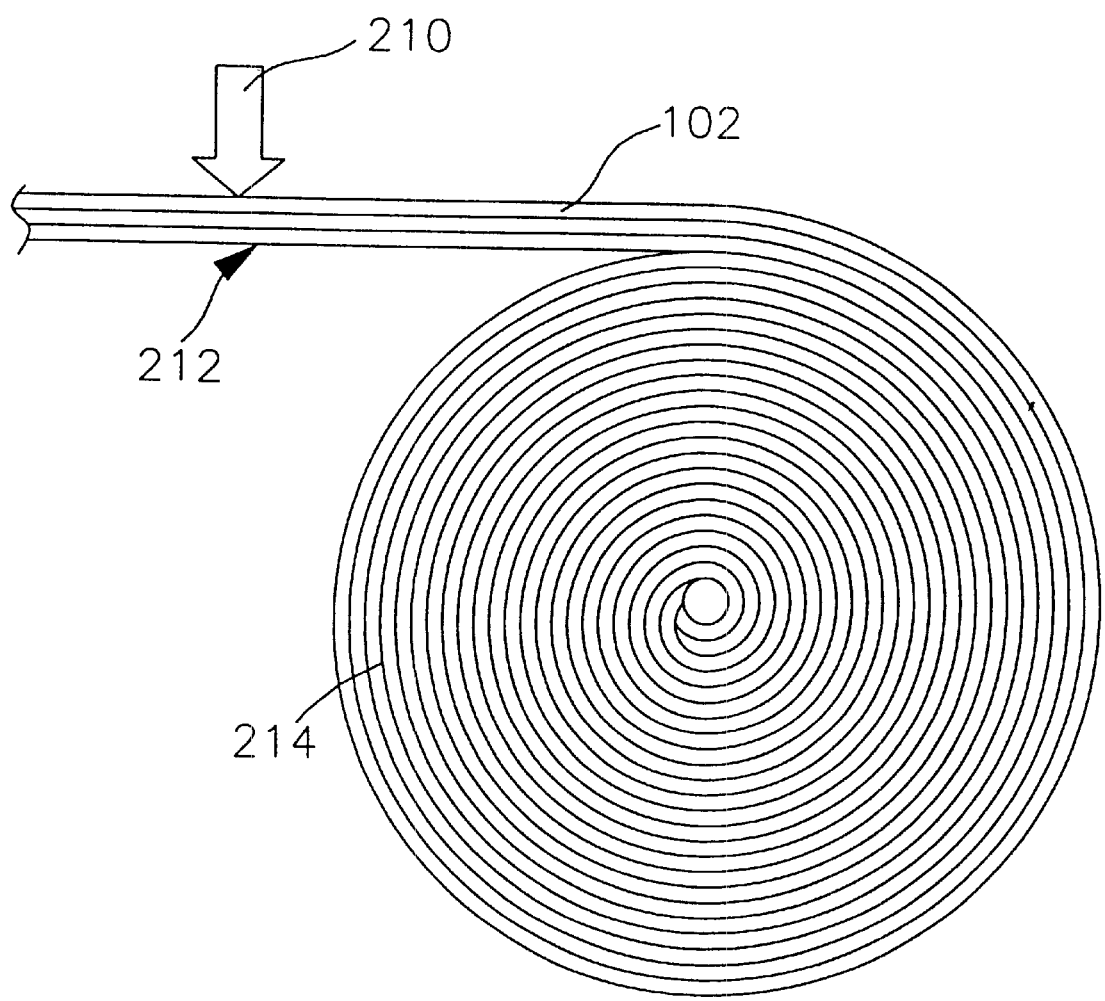
FIG. 16 is a semi-schematic side elevation of a method of heat treating the DL of prelaminate PSA constructions of this invention.

Streaking or the formation of other imperfections in the DL, that expose the underlaying PSA layer, are eliminated by heat treating the prelaminate PSA construction at a stage after application of the DL but before the prelaminate PSA construction 212 is collected on a collection roll 214. Heat treating the DL at this point causes the DL to soften, reflow and migrate to fill in any streaks or imperfections. Referring to FIG. 16, where the DL 102 is applied as a hot melt it is heat treated by exposure to a radiation, convention or conduction heating means as indicated generally by arrow 210 to a flow temperature that is below the detackifying material activation temperature but sufficiently high to cause the detackifying material to reflow and fill any streaks or imperfections. In an example embodiment, where the DL is formed from the first embodiment detackifying materials discussed below and exemplified in Examples 1 and 2, the DL is heated to a temperature of approximately 149° C. (300° F.) to cause it to flow a sufficient amount to fill all streaks or imperfections that expose the underlying PSA, and thereby produce a DL in the form of a continuous film the completely covers the underlaying PSA layer.

Referring still to FIG. 16, where the DL 102 is applied in the form of a solvent or emulsion, the DL is heat treated by exposure to radiation, convention or conduction heating as indicated by arrow 210. Heat treating 210 the DL 102 can take place independently from the evaporation operation, and can be effecting by a heating means that is independent of that used for the evaporating operation. Alternatively, the step of heat treating the DL 102 can be carried out as part of the evaporation operation by further heating the DL after evaporation to a flow temperature that is below the detackifying material activation temperature but sufficiently high to cause the detackifying material to flow and fill any streaks or imperfections. In an example embodiment, where the DL is formed from the first embodiment detackifying materials discussed below and exemplified in Examples 1 and 2, the DL is heated to a temperature of approximately 149° C. (300° F.) after being evaporated to cause it to flow a sufficient amount to fill all streaks or imperfections that expose the underlying PSA, and thereby produce a DL in the form of a continuous film the completely covers the underlaying PSA layer.

In a preferred embodiment, where streaks or other imperfections are discovered to be present in the DL, the DL is heat treated in three continuous zones using forced air convection ovens. The first zone was heated to 100° C., the second to 120° C., and the third to 140° C. Each oven was approximately eight feet in length. The coated laminate traveled at a speed of approximately 50 feet per minute, giving a residence time of approximately 9.6 seconds through each zone.

Samples of prelaminate PSA constructions prepared according to the conditions discussed below were tested to determine the surface roughness of the DL before and after being heat treated in the manner discussed immediately above. The DL of a non-heat treated prelaminate PSA construction had an average surface roughness of approximately 0.87 micrometers, and a RMS surface roughness of approximately 1.08, when measured using a Wyco surface morphology microscope scanned at a magnification of approximately 5.3 times, using a scan area of approximately 1170×880 micrometers, and using a point-to-point distance of approximately 3.10 micrometers. The DL of a heat treated prelaminate PSA construction had an average surface roughness of approximately 0.58 micrometers, and a RMS surface roughness of approximately 0.71 micrometers under the same measurement conditions. Based on these results, the process of heat treating the DL as described herein reduced the surface roughness of the DL by approximately 40 percent, thereby evidencing the filling and minimization of streaks and other imperfections in the DL. Additionally, the heat treated DL also displayed a surface finish that was glossier than that of the non-heat treated prelaminate PSA construction.

A feature of prelaminate PSA constructions of this invention is that they promote flexibility in the manufacturing process by providing a completely nonblocking prelaminate PSA construction that is capable of being activated and laminated at a later time and/or at a different geographic location independent of where the construction was manufactured.

While particular methods for manufacturing prelaminate PSA constructions have been described and illustrated, it is to be understood that conventional methods for applying PSA materials, and for making PSA constructions, can also be adapted to manufacture prelaminate PSA constructions of this invention.

Suitable detackifying materials useful for forming first embodiments of prelaminate PSA constructions, that are capable of being heat activated to transform the DL into a second tacky layer (as shown in FIG. 7), include heat-seal adhesives, modified heat-seal adhesives, and delayed-action heat-seal adhesives that: (1) are good continuous film formers; (2). are capable of completely and uniformly covering the underlying PSA layer; and (3) have inherent properties of open tack. Exemplary detackifying materials are thermoplastic heat-seal adhesives selected from the group including polyamide resins, polyester resins, polyurethane resins, polyacrylate resins, ethylenevinylacetate resins, and mixtures thereof.

It is desired that the detackifying material selected to form first and second embodiment prelaminate PSA constructions produce a second tacky layer that has a higher degree of adhesion to a laminated second substrate than the degree of adhesion between the PSA layer and the release liner to facilitate preferable release of the release liner from the laminated construction to ready the laminated PSA construction for application onto a desired object.

When the detackifying material used to form the first embodiment prelaminate PSA construction is applied in the form of a hot melt, solution, or emulsion by dual die method, it is desired that the detackifying material have a hot melt, solution, or emulsion viscosity during the coating operation that is within a viscosity window similar to that of the PSA material. This is desired to enable the detackifying material to form a continuous film that completely and uniformly covers the underlying PSA layer, thereby forming a nonblocking prelaminate PSA construction. The simultaneous delivery of the PSA and detackifying material is possible using conventional coating equipment and a multi-die or an extruder if the viscosities between the respective materials are relatively close and the two materials do not significantly interact with each other. When applied simultaneously using conventional die methods it is desired that the PSA and detackifying material have a hot melt viscosity and melting temperature that are relatively similar. The use of polyamide resins in particular are suitable detackifying materials for conventional hot melt adhesives because their viscosities are similar in magnitude at the application temperatures used to deliver the respective materials.

For example, when the PSA is a conventional hot melt adhesive, the melting temperatures of the PSA are in the range of from about 150° C. to about 200° C., and preferably in the range of from about 165° C. to about 180° C. It is, therefore, desired that the detackifying material selected for use with such PSA have a melt temperature below about 200° C., and preferably in the range of from about 150° C. to 180° C.

Conventional hot melt PSAs have a Brookfield viscosity in the range of from about 25,000 to 90,000 centipoise at 175° C. It is desirable that the detackifying material that is used with such PSA have a viscosity that is within a factor of about two times that of the PSA. A detackifying material having a hot melt, solution, or emulsion viscosity more than about a factor of two times below that of the PSA material can produce a DL having film defects that prevent complete and uniform PSA layer coverage. A detackifying material having a hot melt, solution, or emulsion viscosity having a factor of about two times greater than the PSA material can produce a DL that also displays film defects, thereby preventing complete and uniform PSA layer coverage. Preferred detackifying materials have a hot melt, solution, or emulsion viscosity window during coating by dual die process within a factor of about two percent that of the viscosity of the just-applied PSA material.

It is desired that the detackifying material, selected to form first and second embodiment prelaminate PSA constructions also have a chemistry that is not compatible with the underlying PSA material to prevent its migration into the PSA layer during activation. Migration of the detackifying material into the PSA layer is not desired in such embodiment of the prelaminate PSA construction because it can reduce the adhesion performance of the functional PSA underlayer.

A key desired feature of the detackifying material used to form the first embodiment prelaminate PSA constructions is that it have an open tack time that both facilitates prelaminate PSA construction manufacturing efficiency, and permits lamination at ambient or subactivation process temperature conditions. "Open tack" refers to the amount of time that ajust-deposited or just-activated detackifying material remains tacky or open to adhesive contact with an adjacent surface. Certain polymers, when heated to their melting temperature and cooled, require an amount of time to fully harden. During such time the polymer can remain tacky. This period after cooling where the polymer remains tacky permits ambient or subactivation temperature lamination of a second substrate to the tacky surface, which is highly desirable.

During the process of manufacturing the prelaminate PSA construction it is desired that the open tack time be as short as possible to facilitate collecting the prelaminate PSA construction shortly after the detackifying material is applied, thus speeding up the rate of manufacture. However, it is also desired that the open tack time be sufficiently long to allow the just-activated detackifying material time to cool before lamination, thereby permitting ambient process temperature or subactivation lamination. Open tack, therefore, represents a compromise between competing process concerns.

In an exemplary embodiment, it is desired that the detackifying material have an open tack time greater than about 0.25 seconds and less than about twenty seconds, and preferably less than about five seconds after activation. To reduce the open tack time during the process of laminating the prelaminate PSA construction, and thereby speed up the rate at which the construction is laminated, the just-activated prelaminate PSA construction may be cooled before lamination by use of a conventional cooling means placed between the activation means and the lamination means. Cooling the just-activated prelaminate PSA construction allows lamination to occur at ambient or subactivation process temperature conditions shortly after heat activation.

It is also desired that detackifying materials selected to form first, second and third embodiment prelaminate PSA constructions of this invention be capable of being activated in a relatively short period of time to facilitate activation and lamination efficiency. Preferred detackifying materials useful in forming DLs of this invention are capable of being activated in less than about five seconds, and more preferably in about one second. For first and third prelaminate PSA construction embodiments, such activation is achieved by exposing the DL to heat at a predetermined temperature for a period of less than about five seconds, and for second embodiment prelaminate PSA constructions such activation is achieved by exposing the DL to a suitable chemical for a period of less than about five seconds.

It is also desired that the detackifying material, selected to form first and second embodiment prelaminate PSA constructions, act as a barrier to prevent the migration of unwanted PSA constituents to the laminated second substrate and visa versa. The migration of such PSA constituents, such as mobile oils and tackifying resins and the like used in hot melt PSAs, to the second substrate is not desired because it can degrade and damage the cosmetic and functional features of the laminate. Additionally, migration of constituents from the second substrate into the PSA layer may adversely affect the adhesive performance of the PSA. The barrier function of the detackifying material is also desired because it allows for the use of porous second substrates that otherwise would not hold up because of the migration of such constituents.

Preferred heat-seal adhesives are thermoplastic polyamide resins. Particularly preferred polyamide resins are those commercially available, for example, from Union Camp of Wayne, N.J. under the Uni-Rez product line. Polyamide resins available from General Mills, Inc., of Minneapolis, Minn. under the Versamid product name can also be used. Other suitable polyamides include those produced by condensing dimerized vegetable acids with hexamethylenediamine.

Referring to the Union Camp heat-seal adhesives, the particular Uni-Rez polyamide resin or resin blend that is selected ultimately depends on the particular prelaminate PSA construction application and, more specifically, depends on the viscosity of the PSA material used to form the underlying PSA layer. In an exemplary embodiment, where the underlying PSA material is S-246, a preferred polyamide resin comprises a blend of Uni-Rez resins that provides a desired viscosity within the range described above. In an exemplary embodiment, where the underlying PSA material is S-246, a preferred detackifying material formed from the polyamide resin comprises a blend of Uni-Rez resins that provides a desired viscosity within the range described above. For example, a 1:3 mixture of the Uni-Rez 2620 and 2623 polyamide resins produces a blend having a Goettfert viscosity curve at 155° C., within a shear rate range of from 0 to 40,000 seconds$^{-1}$, that is within a factor of about two times the Goettfert viscosity curve at 155° C. for the S-246 PSA material.

Table 1 below sets forth example Uni-Rez polyamide resins useful as detackifying materials in this invention, either alone or in combination. Additionally, as noted in Table 1 below, polyamide resins useful as detackfying materials for this invention form inherently self-supporting films that exhibit properties of tensile strength and, elongation. As will be better discussed below such supporting properties are desired for the reinforcing effect that such materials provide to the laminated PSA construction, which can be beneficial for converting and dispensing operations.

TABLE 1

| Uni-Rez product code | Softening Point (° C.) | Viscosity (cPs at 190° C.) | Tensile Strength (Psi) | Percent Elongation | Peel |
|---|---|---|---|---|---|
| 2620 | 105 | 900 | 1,000 | 50 | 0 |
| 2623 | 136 | 6,500 | 1,000 | 400 | 0 |
| 2665 | 165 | 11,000 | 2,000 | 500 | 0 |
| 2695 | 128 | 5,000 | 200 | 175 | 30 |
| 2620 & 2623 (1:3 blend) | 128 | 5,100 | 1,000 | 313 | 0 |

Preferred modified heat-seal adhesives include those heat-seal adhesives previously described that additionally include one or more plasticizers and/or tackifiers to make them behave more like PSAs during their open tack time period. An exemplary modified heat-seal adhesive is a polyamide resin formed by condensing equal molar amounts of Hystrene 3695 dimer acid available from Humco of Texarkana, Tex. with hexamethylenediamine, taking 50 percent by weight of such polyamide resin and adding to it about 25 percent by weight castor bean oil, and 25 percent by weight Foral 85 rosin ester tackifier from Hercules Inc., of Wilmington, Del.

Delayed-action heat-seal adhesives useful for forming first embodiment prelaminate PSA constructions of this invention are formed from polymers that normally do not possess open tack, but are mixed with one or more solid plasticizer. When melted, the solid plasticizer causes the nontacky polymer to become tacky, and remains liquid for some time after cooling to provide an open tack. Suitable delayed-action heat-seal adhesives are commercially available from, for example, Kimberly-Clark, Brown Bridge Industries of Troy, Ohio under the product names 402-MC, 64-BAK, 441-BL and 70-RECA; Oliver Products Company of Grand Rapids, Mich. under its Engineered Adhesive Coated Products line; and Nashua Graphic Products of Merrimack, N.H. under the product names RX-1, BM-4, PBL-3, as described in U.S. Pat. Nos. 2,462,029, 3,104,979, and 2,678,284, which are each herein incorporated by reference.

The heat seal adhesives, particularly the polyamides, serve yet another important function in the post-utilization of the label and tape constructions of this invention. It has been found that when the face stock or backing is paper, and when paper is destined to be recovered in a pulping operation, that the heat seal adhesive can be used to retain the pressure-sensitive adhesive substantially intact during the pulping operation, such that the repulped paper fibers will pass through a screen while the detack layer serves to prevent the polymers forming the pressure sensitive adhesive from contaminating the repulped paper fibers. This finding is particularly useful in the treatment of waste papers containing label and tape products where processing is normally expected to result in the formation of "stickies". It enables removal of a contaminate from paper pulp early in the fiber recovery and the deinking processes.

The paper industry have become favorable towards a screenable adhesive approach to paper fiber recovery processes which has been in use by non-pressure sensitive adhesive manufacturers. The limitation of this approach for a pressure-sensitive adhesive is that pressure sensitive adhesives are engineered to be elastic and deformable and will readily pass through even fine screens. The use of a laminate construction according to this invention enables one to take advantage of the relatively non-elastic film forming characteristics of the polyamide DL to separate the pressure sensitive adhesive from paper pulp, as the polyamide layer will not fragment into smaller particles and will aggressively retain the adhesive to itself during the paper defibering process. Further, the use of polyamides is desired in such application because they are known to form a bond with the PSA layer that is stronger than one formed with the face stock, thereby providing the preferential release of the face stock and the preferential binding of the PSA during the pulping operation.

Consequently, the pressure sensitive adhesive can be readily removed, intact and on relatively non-flexible and three dimensional carrier. The label face stock paper and substrate paper will completely pulp from the adhesive-polyamide film layer with the adhesive firmly attached to the polyamide layer. For use in such application, the polyamide DL layer is preferably applied at a weight of about 4 to about 15 g/m$^2$ and deposited as a hot melt, solvent or emulsion layer. Although the use of polyamides have been discussed for purposes of forming a repulpable laminated PSA construction, other compounds that satisfy the requirements of the detackifying material discussed above, and that are additionally capable of forming: (1) a substantially non-elastic film layer; and (2) a relatively stronger bond with the PSA layer than with the face stock to preferentially tie up or bind up the PSA, can also be used to form repulpable laminated PSA constructions of this invention.

Detackifying materials used for forming first embodiment prelaminate PSA constructions of this invention are preferably applied by single-step multi-die process as previously described and illustrated in FIG. 10, and are preferably applied as a hot melt.

Figure 11:
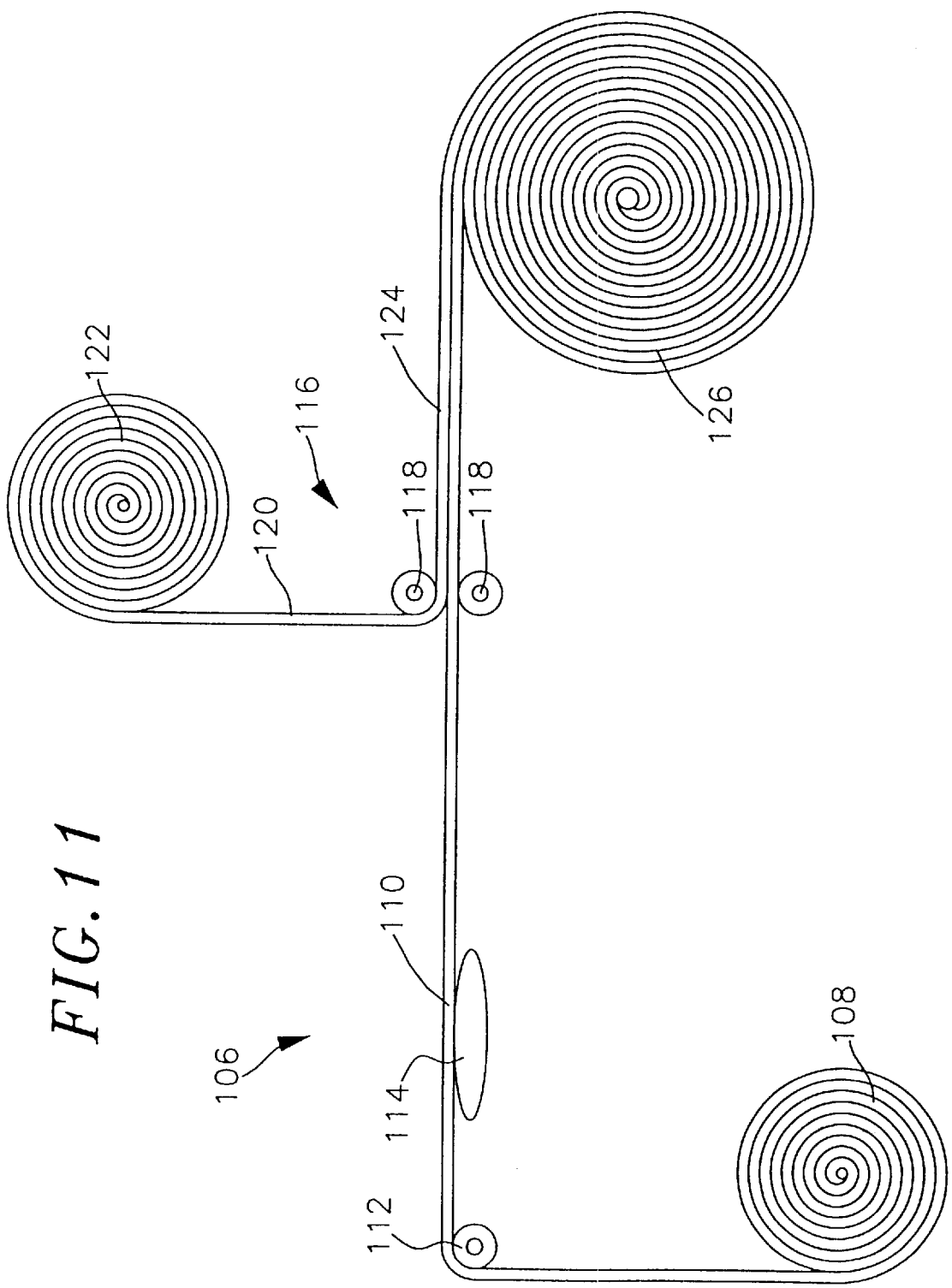
FIG. 11 is a semi-schematic side elevation of a method of activating first and second embodiment prelaminate PSA constructions of this invention and applying a second substrate thereto.

FIG. 11 illustrates an exemplary activation/lamination station 106 that is used to activate and laminate first embodiment prelaminate PSA constructions of this invention embodied in web stock form. The activation/lamination station 106 comprises a pay out roll 108 that unwinds or disperses a continuous roll of the prelaminate PSA construction 110 over a first roller 112 and over an activating means 11 4, where DL is heated to a temperature in the range of from about 100 to about 150° C. It is to be understood that the prelaminate PSA construction 110 illustrated in FIG. 11 comprises a multi-layer construction made up of a release liner, i.e., a liner having a coating of release material disposed thereon, a PSA layer disposed on a surface of the release liner, and a DL disposed on the PSA layer, but has been simplified for purposes of illustration by showing only a single thickness.

The activating means 114 may be selected from those devices that are conventionally used for heating processes and that are capable of transferring heat to the DL by conductive, convective or radiant heat transfer means. In an exemplary embodiment, the activating means 114 is in the form of a heated platen operated at a temperature in the range of from about 75 to about 175° C., that relies on conductive heat transfer to heat the DL. The activation operation is controlled so that a portion of the prelaminate PSA construction has contact with the activating means for up to about five seconds, and preferably about one second.

The just-activated prelaminate PSA construction is routed to laminating means 116 in the form of rollers 118, where the just-activated prelaminate PSA construction 110 is forced into contact with a second substrate 120 and laminated thereto. In an exemplary embodiment, the rollers are adapted to impose a pressure of about ten Newtons/millimeter upon the prelaminate PSA construction and second substrate.

The second substrate useful for forming laminated PSA constructions according to principles of this invention can be formed from any type of flexible material suitable for use with a PSA construction. For example, the second substrate can be in the form of a sheet stock that is utilized in separate sheet form, or roll or web stock that is utilized in a continuous roll. Face stock which is formed into labels is usually wound and unwound in web form and is one form of a web stock that can be laminated to prelaminate PSA constructions of this invention. Examples of second substrate useful for laminating first, second and third activated prelaminate PSA constructions of this invention include but are not limited to labels, label stock, decorative web or sheet stock, signage material and the like that may be formed from paper, foil polymeric film, cardstock, foam, fabric or cloth and the like. The second substrate can be a single layer material, or alternatively may consist of a multi-layer construction.

In one embodiment of a multi-layer second substrate, the second substrate may comprise another prelaminate PSA construction of this invention. Accordingly, first, second and third prelaminate PSA constructions of this invention can be activated and laminated to another activated or unactivated first, second and third prelaminate PSA construction to form a laminated construction having dual first substrates or release liners. Such laminated constructions can be formed by using the same prelaminate constructions, e.g., by laminating a first embodiment prelaminate PSA construction to a first embodiment prelaminate PSA construction, or can be formed by using different prelaminate constructions, e.g., by laminating a first embodiment prelaminate PSA construction to a second embodiment prelaminate PSA construction.

Laminated PSA constructions comprising a second substrate formed from another prelaminate PSA construction may used in applications where it would be advantageous to have PSAs, each having different adhesive properties, at the first and second substrate interface. The use of PSAs having different adhesive properties at each substrate interface may be desirable in applications where the first and second substrates being used are of a different type. For example, a hot melt PSA may be used at an interface with a substrate having a low surface energy surface because of the desired adhesion between hot melt PSAs and low surface energy surfaces, while a emulsion PSA may be used at an interface with a substrate having a corrugated surface because of the desired adhesion between emulsion PSAs and corrugated surfaces.

Laminated PSA constructions comprising a second substrate formed from another prelaminate PSA construction may also be used as a transfer tape, where each substrate is in the form of a release liner that is removable from each respective PSA to facilitate adhering the PSA constructions between two objects after removing both release liners.

Although in FIG. 11 the second substrate 120 is shown to be in the form of a web stock that is unwound from a roll 122, it is to be understood that a second substrate in the form of sheet stock can be used to the same degree. Such sheet stock may, for example, consist of a series of articles bonded to the activated prelaminated construction in a spaced apart arrangement. In this embodiment (not shown in the drawings), the second substrate is not coextensive with the prelaminate construction, so that a portion of the activated adhesive surface remains exposed after the lamination step. Using the DL of the first embodiment, the exposed portion of the DL loses its tack shortly after lamination.

As the first embodiment prelaminate PSA construction passes over the activating means 114 and is heated, the DL undergoes physical change and is transformed into a second tacky layer. The second tacky layer has a sufficient open tack time to permit subsequent lamination without having to heat the second substrate 120, thereby allowing the second substrate to be laminated thereto under ambient or subactivation process temperature conditions, i.e., without having to apply further heat at the nip or to the second substrate. The completed PSA construction 124, comprising a second substrate 120, is collected on a collection roll 126 for storage or for subsequent conversion, e.g., printing, die cutting and matrix stripping as discussed above.

In use, the second substrate 120 remains permanently joined to the previously activated tacky layer of the prelaminate PSA construction 110, and the PSA is separated from the release liner to permit adhesion of the second substrate to a desired object or article.

The ability to provide a prelaminate PSA construction that is heat activatable to permit ambient or subactivation process temperature lamination, i.e., lamination at temperature conditions well below activation temperature, is a key feature of prelaminate PSA constructions of this invention for several reasons. Avoiding the need to heat the second substrate maximizes the different types of substrate materials than can be used with the prelaminate PSA construction, thereby further maximizing manufacturing flexibility. For example, the process of ambient or subactivation process temperature lamination allows the prelaminate PSA construction to be used with a wide variety of face stock paper such as thermal print paper, paper and polymeric films having a low glass transition temperature and the like, that otherwise cannot be used in applications calling for heated lamination.

The process of ambient or subactivation process temperature lamination also avoids problems that are otherwise known to occur at the nip under conditions of heated lamination, such as wrinkling and buckling and the like, that are caused by different coefficients of expansion between the prelaminate PSA construction and the second substrate. Additionally, the process of ambient to subactivation process temperature lamination avoids face stock shrinkage that is known to occur in paper face stocks due to the loss of water that occurs during heated lamination, which can cause curling and the like. Ambient or subactivation process temperature lamination also avoids outgassing of steam or other vapors in the nip that is known to occur during heated lamination, which causes bubble formation at the nip and produces areas of poor anchorage.

Although a key feature of prelaminate PSA constructions of this invention is the ability to laminate after activation without having to further heat the activated prelaminate PSA construction or second substrate, in some situations it may be desirable to introduce further heat to the activated prelaminate PSA construction or to the second substrate, e.g., at the nip and the like, to achieve a desired equilibrium nip temperature that is higher than the otherwise ambient nip temperature. Additionally, in some situations it may be desired to cool the activated prelaminate PSA construction or second substrate to achieve an equilibrium nip temperature that is lower than the otherwise ambient nip temperature.

As used herein, the term "equilibrium nip temperature" is understood to refer to the temperature that is achieved at the nip under steady state conditions. The term "ambient temperature" or "ambient process temperature" is understood to refer to the temperature that is achieved at the nip under steady state conditions without further heating or cooling the activated prelaminate PSA construction before lamination.

Equilibrium nip temperature is achieved by the cooling of the activated prelaminate PSA construction that occurs by contact that is made with the relatively cooler rollers and second substrate. Variations in the prelaminate PSA construction and the second substrate can affect the heat transfer capability of the construction and can, therefore, influence the equilibrium nip temperature. Because of such variations, it may be desired to further heat or cool the activated construction or second substrate to achieve a desired equilibrium nip temperature.

It is to be understood, however, that in all circumstances the equilibrium nip temperature is significantly less than the activation temperature. In a preferred embodiment, the equilibrium nip temperature is between the activation temperature and the ambient temperature, and more preferably is less than about 100° C. In an exemplary embodiment, referring to first and third embodiment prelaminate PSA constructions comprising heat activatable detackifying materials, the equilibrium nip temperature without added heating or cooling at the nip is at an ambient process temperature of about 70° C.

With reference to the second embodiment prelaminate PSA construction, comprising a chemically-activatable detackifying material, it is to be understood that the equilibrium nip temperature without added heating or cooling is at an ambient process temperature near or at ambient room temperature.

For example, it may be desired to add further heat to the nip to raise the equilibrium nip temperature to a desired temperature above the otherwise ambient temperature in circumstances where a reduced pressure lamination is desired. It may be desired to cool the nip to reduce the equilibrium nip temperature to a desired temperature below the otherwise ambient temperature in circumstances where the mass of the activated prelaminate PSA construction is large and/or the mass of the second substrate is small.

Examples illustrative of first embodiment prelaminate PSA constructions, comprising heat activatable detackifying materials capable of forming a second tacky layer, are as follows:

EXAMPLE 1

First Embodiment Prelaminate PSA Construction

A first embodiment prelaminate PSA construction was prepared by hot melt dual die method by applying a PSA layer comprising S-246 adhesive to a 42 pound basis weight Rhi-Liner 12 release liner comprising a layer of General Electric 6000 silicone release material. A DL comprising a blend of Uni-Rez 2620 and 2623 polyamide resin was simultaneously applied to a surface of the PSA layer. The coat weight of the PSA adhesive was about 20 g/m$^2$, or about 20 micrometers thick. Five grams of Leucopure EGM UV chromophore was added to about five gallons of the polyamide blend at a blend ratio of one gram Leucopure per gallon resin to permit visual observation of the DL under a UV light. The polyamide resin blend comprised about 25 percent by weight 2620 and 75 percent by weight 2623. The polyamide resin was applied at a coat weight of about 10 g/m², or about 10 micrometers thick. The resulting DL had an open time of less than about five seconds.

The prelaminate PSA construction was heat activated by running the backside surface of the release liner over a heated platen that was set for about 175° C. The speed of the web unwinding was set to provide a prelaminate PSA construction exposure time to the heated platen of about one second. The ambient process temperature at the lamination nip was estimated to be about 70° C. The lamination was carried out at a speed of about 40 feet/minute, and the nip was positioned about six inches past the trailing edge of the heated platen.

The activated prelaminate PSA construction was laminated to a number of different face stock materials, including thermal print paper and 50 pound uncoated litho paper. In all cases, anchorage was excellent and there was no thermal damage to the face stock.

Lay flat tests were conducted on 216 millimeter by 280 millimeter rectangular-shaped samples of the above-prepared laminated PSA construction comprising the 50 pound uncoated litho paper. Lay flat tests were also conducted on conventional PSA constructions comprising a 50 pound clay coated machine finish paper release liner, an acrylic emulsion PSA disposed thereon, and a 50 pound uncoated wood-free high-quality laser face stock.

During the tests, the samples were placed in a constant humidity chamber operated at 25, 50 and 75 percent relative humidity and at about 20° C. The samples were oriented with the second substrate up, i.e., face stock up, as well as release liner side up. After five minutes exposure, and after one hour exposure, measurements were taken of the average curl at corner of each rectangular sample from a flat surface. No appreciable differences in curl was noted between five minutes and one hour for the samples of the laminated PSA construction of this invention, with the samples displaying a radius of curvature of greater than about 14, or an edge lift of less than about three millimeters. For purposes of reference and comparison, a radius of curvature of infinity represents a perfectly flat construct with zero curl, and a curl having a radius of curvature of from between infinity to 14 inches or greater is considered to be acceptable.

The samples of the conventional PSA constructions displayed an edge lift of greater than about six millimeters, and in some cases up to about 12 millimeters. The results of the lay flat tests indicate that PSA constructions of this invention produce laminated PSA constructions that display a significant improvement in lay flat properties when compared to conventional PSA constructions.

The improved lay flat properties achieved from using prelaminate PSA constructions of this invention are believed to be due to the use of ambient or subactivation process temperature lamination that avoids substrate shrinkage that otherwise is known to occur during a heated lamination by water loss, and that is a known cause of edge lift.

Samples of the laminated PSA construction prepared in Example 1 were tested for tensile strength at a web speed comparable to that used during a die cutting and matrix stripping conversion process, as measured crosswise across the width of the web (cross direction). Face stocks of laminated PSA constructions of this invention were found to have a tensile strength up to about 20 percent greater than that measured for the second substrate, i.e., face stock, alone. The improved face stock tensile strength is believed due to the presence of the DL, or the second tacky layer after activation and lamination, as a reinforcing material in the laminate PSA construction.

The improved tensile strength exhibited by face stocks of this invention is important for several reasons. Such improvement facilitates conversion of the laminated PSA construction, for example by die cutting and matrix stripping methods as discussed above, by allowing the laminate construction to be processed at higher web speeds without matrix breaking and the like, thereby making the converting process more efficient. Also, such an improvement allows the laminated PSA constructions to be manufactured from lighter-weight paper stocks, e.g., the second substrate or face stock, because of the reinforcing effect provided to the construction by the DL, thereby reducing the raw material costs associated with making the laminated PSA construction.

EXAMPLE 2

First Embodiment Prelaminate PSA Construction

A first embodiment prelaminate PSA construction was prepared by hot melt dual die process by applying a PSA layer comprising S-246 PSA to a 42 pound basis weight Rhi-Liner 12 release liner, comprising a layer of General Electric 6000 silicone release material disposed thereon. A DL comprising Uni-Rez 2623 was simultaneously applied to the PSA layer. The coat weight of the PSA layer was about 20 g/m², and the coat weight of the DL was about 15 g/m².

Samples of the Example 2 prelaminate PSA construction were activated and then laminated to a back side of a 60 pound Krome Kote face stock, available from Champion International Corp., of Stamford, Conn. for purposes of measuring the loop tack and 90 degree peel (20 minute dwell) for one inch wide sample sections. The substrate that was used was stainless steel. The testing was carried out on a Instron Universal Tester at a rate of 200 millimeters per minute. Shear tests were subsequently carried out where the dwell time in minutes of cohesion were measured for 13 millimeter by 13 millimeter samples on stainless steel with a 500 gram weight. The testing was then repeated using a conventional laminated PSA construction comprising an S-246 and 60 pound Krome Kote laminate construction.

Comparison loop tack, peel, and shear test data is set forth in Table 2, where "I" refers the sample of the prelaminate PSA construction of this invention, and "S" refers to the standard PSA construction.

TABLE 2

| Test Value | Sample | Value (Force (in Newtons/m) | Average (Newton/m) |
|---|---|---|---|
| Loop tack | I | 19.2 | |
| Loop Tack | I | 15.1 | |
| Loop Tack | I | 18.9 | 17.7 |
| Loop Tack | S | 20.5 | |
| Loop Tack | S | 16.6 | |
| Loop Tack | S | 14.0 | 17.0 |
| 90 Degree Peel | I | 10.2 | |
| 90 Degree Peel | I | 11.6 | |

TABLE 2-continued

| | | | |
|---|---|---|---|
| 90 Degree Peel | I | 10.3 | 10.7 |
| 90 Degree Peel | S | 11.2 | |
| 90 Degree Peel | S | 10.9 | |
| 90 Degree Peel | S | 12.6 | 11.6 |

| Test Value | Sample | Value (Shear (in Minutes) | Average (Minutes) |
|---|---|---|---|
| Shear | I | 1509 | |
| Shear | I | 1059 | |
| Shear | I | 1358 | 1308 |
| Shear | S | 677 | |
| Shear | S | 594 | |
| Shear | S | 556 | 609 |

The test data demonstrates that the laminated PSA construction of Example 2 has superior shear properties when compared to a conventional laminated PSA construction that does not include the activated DL. It is believed that such enhanced shear properties is due in part to the reinforcing effect that the DL has on the construction. This reinforcing effect, as mentioned above with regards to improved tensile strength, is desired as it allows for the use of lighter-weight second substrates in manufacturing such PSA constructions.

A second embodiment prelaminate construction is formed by using a detackifying material that is capable of being chemically activated to transform the DL into a second tacky layer (as shown in FIG. 7). Suitable second embodiment detackifying materials include those materials that are capable of displaying adhesive properties when exposed to chemicals such as organic or inorganic solvents, e.g., water activatable gums, adhesives, starches and the like, polyvinyl alcohol mixtures, polyamides, high glass transition temperature acrylates, ethylene vinyl acetate, polyacrylic acid and the like, and other chemicals that upon exposure to water, steam, other inorganic solvents or organic solvents react to form a second tacky layer.

Second embodiment detackifying materials can be applied in the same manner as described above for the first embodiment detackifying material. The chemical activating agent can be applied to the DL surface by conventional techniques, such as by spray application to a passing roll of the PSA label construction, ultrasonic wetting, condensation wetting, electrostatic spraying and the like. Alternatively, the chemical activating agent can be applied to the DL surface by roll or die methods if precautions are taken to avoid contact between the activated DL and a dry roll or die.

Like the first embodiment detackifying materials, it is desired that the second embodiment detackifying materials: (1) be good continuous film formers; (2) be capable of completely and uniformly covering the underlying PSA layer; and (3) have inherent properties of open tack.

An example illustrative of second embodiment prelaminate PSA constructions, comprising chemically-activatable detackifying materials capable of forming a second tacky layer, is as follows:

EXAMPLE 3

Second Embodiment Prelaminate PSA Construction

A second embodiment prelaminate PSA construction was prepared by hot melt dual die process by applying a PSA layer comprising S-246 PSA to a 42 pound basis weight Rhi-Liner release liner, comprising a layer of General Electric 6000 silicone release material disposed thereon. A DL comprising a blend of 25 percent by weight Uni-Rez 2620 and 75 percent by weight Uni-Rez 2623 was simultaneously applied to the PSA layer. The coat weight of the PSA layer was about 20 g/m$^2$, and the coat weight of the DL was about 10 g/m$^2$.

A sample of the DL was moistened with a solvent mixture consisting of about 70 percent by weight isopropyl alcohol and 30 percent by weight toluene. The solvent was applied from a piece of felt that had been soaked in the solvent mixture. Within one second of being contacted with the solvent a piece of 50 pound uncoated litho paper was hand laminated to the solvent activated layer, and after allowing to dry for one hour at room temperature was observed to display good lay flat properties and anchorage to the face stock.

A third embodiment prelaminate PSA construction is formed by using a detackifying material that is capable of forming a continuous film that completely covers the PSA layer, and that is heat activated to migrate into the body of the PSA layer (as shown in FIG. 8) to expose an underlying tacky PSA surface. Generally, heat-activated migration is not a preferred mechanism of activating prelaminate PSA constructions because the migratable species or constituents of the detackifying material may end up contaminating the bulk of the PSA and adversely affecting the overall properties of the PSA. Heat-activated migration is, however, useful in applications where it is desired that the PSA itself bond directly to the intended second substrate during lamination.

In forming third embodiment prelaminate constructions of this invention it is desired the PSA that is selected have little or no mobile species, e.g., in the form of liquid plasticizers, liquid tackifiers, and sometimes residual monomers. In the case of rubber-based PSAs, it is desired that the amount of plasticizing oils be significantly reduced or even eliminated. In place of such oils, tackifying resins having a softening point in the range of from about 20 to about 30° C. can be used. Additionally, polymers can be added to the PSA formulation for the purpose of reducing cold flow properties to a point that the DL of such third embodiment will properly passivate the adhesive and render the entire construction substantially block free.

Suitable detackifying materials useful in forming such third embodiment prelaminate PSA constructions are preferably formed by applying an approximate 10 percent by weight solids dispersion of the reaction product of one or more bases with one or more polar fatty acids containing from about 10 to about 24 carbon atoms, tall oil rosin acids and/or olefinic polymers having acid functionality. The preferred bases are amines such as ethylenediamine. Another functional amine is N,N,N',N'-tetramethyl ethylenediamine.

The presently preferred fatty acids are 12-hydroxystearic acid derived from castor beans and marketed as Cenwax-A by Union Camp, tall oil rosin acids such as Unitol NCY manufactured and sold by Union Oil Co., dodecanedioic acid sold by Dupont and a mixture of behenic acid, a C-22 polar fatty acid, and arachidic acid, a C-20 fatty acid, sold as Hystrene 9022 FLK by Humco. Detackifying materials formed by reaction of a preferred amine with one or more of the acids and, as indicated above, are applied as an about 10 percent by weight solids dispersion in water with the concentration of organic amine being controlled to just completely react with the fatty acids.

The presently preferred compositions are about 10 percent by weight aqueous dispersion of amine salts formed by dispersing the following fatty acid mixture of about 75 percent by weight 12-hydroxystearic acid, about 10 percent by weight tall oil rosin acid and about 15 percent by weight dodecanedioic acid in hot water using ethylenediamine as the base or dispersion agent. Inorganic bases, such as alkali metal hydroxides, can also be used.

The detackifying material used for forming third embodiment prelaminate PSA constructions preferably consists of a mixture of flat plate-shaped particles and spherical particles, which particles do not display a tendency to migrate into the body of the PSA. The plate-shaped particles interlock to form a continuous PSA covering film. This requires that the shape of the particles in the dispersion be in the form of thin plates that can form many barrier layers when coated. It is believed that the spherical particles aid in drying and control polarity to optimize thermal migration properties into any given PSA.

The weight ratio of plate-shaped particles to spherical particles should be adjusted to provide in the range of from about 5 to about 50 percent polymer spheres on a dry weight basis of the total solids in the dispersion. At any less than about 5 percent spherical particles, the coatings require long drying times because water molecules have difficulty in diffusing through the layered platelets. At more than about 50 percent spherical particles, there is a loss in shelf life due to the lack of enough flat platelets to form a suitable block resistant coating.

The detackifying material is best dried at a moderate temperature during both the wet drying phase, as well as the final drying phase. If during the wet drying phase the temperature becomes too hot, the hot water soluble fatty acid salt particles can redissolve resulting in a loss of flat plate layering. Such a loss results in a reduced shelf life. During the final stages of drying, care must be taken to prevent the activation of the now heat activatable substrate. For these reasons, the drying temperature should be maintained at about 175° F. Since this temperature is quite low, high velocity air impingement and pre-drying of the air are both recommended.

When using high velocity air impingement, it is important that the detackifying material dispersions themselves behave in a thixotropic manner. This allows them to properly flow out onto the adhesive surface when coated under the conditions of shear, and to self thicken prior to air impingement to prevent them from being physically blown off of the prelaminate PSA construction.

Detackifying materials used to form third embodiments of prelaminate PSA constructions of this invention are preferably applied by a tandem coating method, and are applied as a dispersion. Third embodiment detackifying materials are preferably applied using Meyer rod or reverse roll coating method, as it is believed that either such method results in the alignment of the plate-shaped particles in the machine direction, which is critical to obtaining non-blocking properties.

The third embodiment prelaminate PSA construction is completely nonblocking as described above, and is activated and laminated in the same manner as described above for the first embodiment prelaminate PSA construction, i.e, by running the prelaminate PSA construction across an activating means and then through a laminating means operated at ambient or subactivation process temperature conditions, as shown in FIG. 11. When the prelaminate PSA construction is routed past the activating means the DL becomes heated, causing its constituents to migrate into the underlying PSA layer body, thereby exposing the underlying tacky PSA surface for lamination.

A feature of the third embodiment prelaminate PSA construction is that migration of the detackifying material constituents into the PSA layer is effected by heat only, and does not require the use of pressure to force the constituents therein. Further, like the first embodiment, such heat activation is accomplished in a short amount of time. In an exemplary embodiment, activation of the third embodiment DL occurs by exposing the prelaminate PSA construction to a temperature of about 150° C. for a period of about one second.

Third embodiment prelaminate PSA constructions, prepared according to principles of this invention, comprise a DL formed from a dispersion of plate-shaped and spherical particles, and will be better understood by referring to the following examples:

Component 1

Formation of Dispersion Consisting of Plate-shaped Particles

Plate-shaped particles useful for forming a third embodiment DL dispersion are formed by combining the following fatty acids together and mixing until uniform: 75 percent by weight Cenwax-A from Union Camp; 15 percent by weight dodecanedioic acid from Dupont of Wilmington, Del.; and ten percent by weight Unitol NCY rosin acid from Union Camp. The fatty acid mixture is then poured out onto a siliconized liner and is allowed to solidify. Ten percent by weight of this fatty acid mixture is then mixed with 90 percent by weight of deionized water. The mixture is then heated to melt the fatty acid mix on top of the water. Ethylenediamine is slowly added while stirring the contents until the resultant solution just clarifies. The hot solution is then transferred to a jar that is about ¼ full of ten millimeter steel bars, covered, and placed on a roller mill for about 24 hours. The resultant dispersion is referred to as Component 1 and consists of flat plate-shaped particles.

Component 2

Formation of Dispersion Consisting of Spherical Particles

Spherical particles useful for forming a third embodiment DL dispersion are formed by combining the following ingredients together and mixing until uniform: ten percent by weight AC-580, a polyethylene acrylic acid copolymer from Allied Signal of Morristown, N.J.; 87 percent by weight deionized water; and three percent by weight ethylenediamine. The ingredients are combined and placed into a reactor that is equipped for stirring, and are heated to a temperature of about 115° C. The heated mixture is stirred until a uniform stable dispersion of spherical particles results, that is referred to as Component 2.

Component 3

Formation of EDA Dispersed Shellac

A EDA dispersed shellac for use in forming third embodiment DL dispersions is formed by combining about ten percent by weight lemon yellow No. 1 shellac from Zinsser Analytic U.K., Ltd., of Maidenhead, England; with 90 percent by weight deionized water. The mixture is heated to its boiling point, and ethylenediamine is slowly added while stirring. The ethylenediamine is added until no more turbicidy is present, and the solution resembles the purple color of grape juice. The mixture is then allowed to cool to room temperature and is filtered to form a EDA dispersed shellac dispersion referred to as Component 3.

The dispersions referred to as Components 1, 2 and 3 are combined and mixed until uniform to form the detackifying material useful for forming the DL for third embodiment prelaminate PSA constructions of this invention. An example third embodiment prelaminate PSA construction is prepared by using the above-described dispersion detackifying material, as follows:

EXAMPLE 4

Third Embodiment Prelaminate PSA Construction

A rubber-based hot melt PSA formulation is prepared by combining the following ingredients together, melting the combined ingredients at a temperature of about 150° C., and mixing the combined ingredients until uniform: about 13 percent by weight Pentalyn H, a rosin ester of pentarythritol from Hercules, Inc.; 37 percent by weight Escorez 1304, a C5 resin from Exxon Chemical Co., of Houston, Tex.; 34 percent by weight Kraton 1112, a SIS elastomer from Shell Chemical Co., of Houston, Tex.; five percent by weight Adtack LV, a tackifying mixture from Hercules, Inc.; nine percent by weight Unitac R-40, an ester of wood rosin from Union Camp; one percent by weight Ethanox 330, an antioxidant from Ethyl Corp., of Richmond, Va.; and one percent by weight Cyantox LDTP, an antioxidant from American Cyanamid Company of Wayne, N.J.

The resulting PSA is directly coated onto a release liner made from 42 pound bias weight Rhi-Liner liner comprising a layer of GE 6000 silicone release material disposed thereon. The PSA thickness is in the range of from about 18 to 20 g/m$^2$. A ten percent solid aqueous dispersion of the detackifying material prepared above by combining Components 1, 2 and 3 is then coated directly onto the PSA surface using a No. 8 Meyer rod. The third embodiment prelaminate PSA construction is then dried at a temperature of about 80° C. is a forced air convection oven.

A key feature of prelaminate PSA constructions prepared according to principles of this invention is that they display excellent nonblocking properties, thereby allowing the construction to be placed against a contiguous backside surface of the release liner, or any other object surface, without adhesive interference therewith. Prelaminate PSA constructions of this invention have been tested to determine their minimum nonblocking temperature. An example of the block testing that was conducted is as follows:

Block Testing—Second Embodiment Prelaminate PSA Construction

A polyamide resin was prepared by reacting equimolar quantities of 1,6-hexanediamine with Hystrene 3695 dimer acid from Humco. The resulting mixture was dissolved at about 20 percent solids into the following solvent mixture; 25 percent by weight of 2-propanol, 25 percent by weight of 1-pentanol, and 50 percent by weight of 2-butanol.

A 42 pound bias weight Rhi-Liner SCK stock from Rhinelander was coated with G.E. 6000 silicone release formulation to a coat weight of about 1 g/m$^2$, forming a first release liner. A hot melt PSA was coated onto the surface of the first release liner at a coat weight of about 20 g/m$^2$, and a second release liner of very low release force was laminate to the exposed PSA to form a construction consisting of PSA between the two release liners. The construction was placed on an unwind of a pilot coater, the laminate was unwound, and the second release liner was removed to expose the active PSA surface.

The polyamide solution prepared above was coated directly onto the exposed PSA surface by direct application from a smooth steel roll in a pan fed nip. The prelaminate PSA construction was dried in air floatation ovens having three zones set for about 82° C. The resultant coating was uniform and tack free, producing a completely detackified prelaminate PSA construction. The dried coat weight of the polyamide DL was measured to be about four g/m$^2$.

Samples from the above-described prelaminate PSA construction consisted of four 50 millimeter by 200 millimeter strips. The strips were block tested on a gradient temperature hot plate operated in the range of from about 26° C. to about 115° C. A first strip was placed on the hot plate with the DL positioned adjacent the hot plate surface and a backside surface of the first release liner directed up. A second strip was placed on top of the first strip with its DL positioned against the backside surface of the release liner from the first strip, i.e., with second strip's DL facing upwardly. The strips were oriented on the gradient hot plate in their machine direction between a temperature gradient of from about 35° C. to about 85° C.

A weight of about 22 kilograms was placed on a sufficient area the DL of the second strip to impose a pressure of about 40 kPa on the combined first and second strip prelaminate PSA constructions. After about 24 hours at the about 40 kPa, the samples were removed and observed for blocking. Blocking, for purposes of this test, is defined as the point at which the adhesive of the second strip transfers from the release liner of the second strip. Blocking, at a hand delamination peel rate of about 25 millimeters/sec, was observed to occur between the two strips at a temperature of about 70° C. The force needed to peel the adhesive from the release liner was in the range of from about 0.8 to 1.2 grams/ millimeter.

The result of such experiment demonstrates that prelaminate PSA constructions of this invention are nonblocking to a minimum temperature of at least 50° C., and in some instances to about 70° C. for 24 hours at a pressure of about 40 kPa.

EXAMPLE 5

Repulpability of First Embodiment PSA Embodiment

Labels constructed according to Example 1 were made using a multi-die coating technique with the polyamide layer being about 15 g/m$^2$. The labels were applied to copy paper. The paper containing the label was cut into 0.5 inch by 0.5 inch squares to facilitate disintegration of the paper during a pulping process. The paper was disintegrated in a British disintegrator at about a 4% consistency level. The Samples were taken every 5 minutes for 15 minutes. Water temperature was 25° C. and no additional chemical, such as sodium hydroxide, was added to the paper. Handsheets were then made from the pulp using a standard handsheet process. The handsheets were pressed, dried and at times, stained. The polyamide did not break up into small pieces, but retained intact in the same size as it was cut.

In another study, the relative cleanliness of handsheets formed after the pulping operation was evaluated. In such study, paper alone was compared to paper and film coated with S-246 adhesive and S-490 adhesives with and without the polyamide layer. The results are shown in Table 3 below and confirm that the use of polyamide provide a handsheet quality that equaled that of the adhesive coated film and almost equaled the paper alone.

TABLE 3

| Sample | Handsheet Contaminant Level, PPM |
| --- | --- |
| Paper alone | 8–15 |
| Paper + polyamide + S-246 | 25 |
| Paper + polyamide + S-490 | 25 |
| Film + S-246 | 30 |
| Film + S-490 | 30 |
| Paper + S-246 | 1800 |
| Paper + S-490 | 700 |

If desired, prelaminate PSA constructions of this invention can be further treated after activation and before lamination. For example, just-activated prelaminate PSA constructions of this invention can be remoisturized after activation to restore moisture that is lost from the first substrate, i.e., the release liner, during the process of heat activation. Such remoisturizing process can be effected by conventional means, such as by passing the just-activated prelaminate PSA construction through a mist station designed to apply a mist of water to the release liner when it passes thereby. The ability to remoisturize the release liner after activation is desired because it helps to retain the flexibility of the release liner, thereby helping to prevent cracking and the like during removal of the release liner from the laminated PSA construction.

Additionally, prelaminate PSA constructions of this invention can be cooled between the activation and lamination processes to reduce the temperature of the just-activated prelaminate PSA construction to below ambient process temperature or below activation temperature, i.e., subactivation process temperature. Such cooling of just-activated prelaminate PSA constructions of this invention may be desired where extremely temperature sensitive face stocks are to be laminated.

Figure 12:
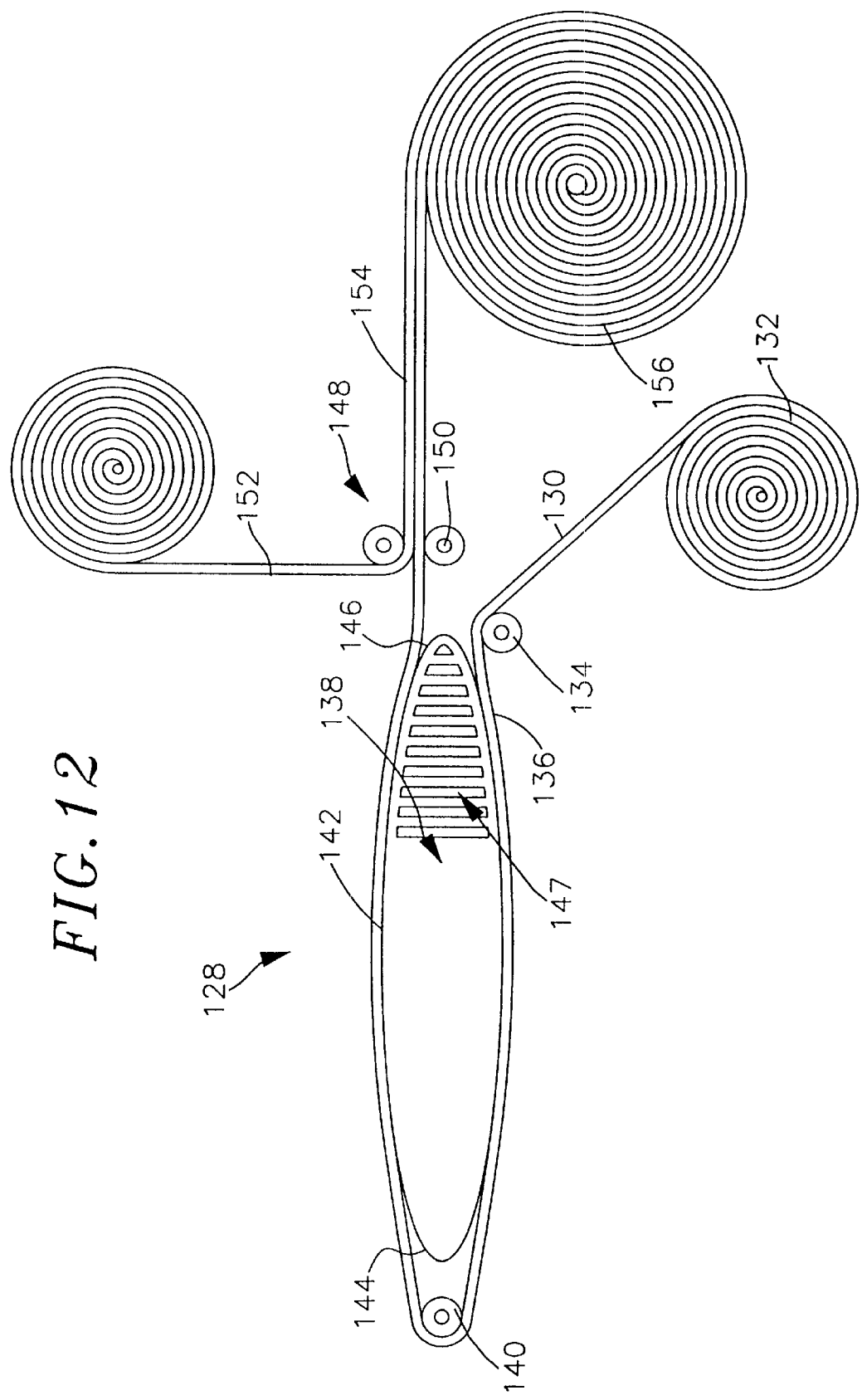
FIG. 12 is a semi-schematic side elevation of an alternative method of activating first and second embodiment prelaminate PSA constructions of this invention and applying a second substrate thereto using preheating.

Referring to FIG. 12, an alternative activating/laminating process 128 for use with prelaminate PSA constructions of this invention incorporates the step of preheating the prelaminate PSA construction before activation for purposes of energy saving and the like. In an exemplary embodiment, the process 128 involves routing the prelaminate PSA construction 130 in continuous sheet form from a pay out roll 132 to an idler roll 134 positioned adjacent a backside surface 136 of a heated platen 138. For purposes of simplicity, the multi-layer prelaminate construction has been shown having a single thickness. The prelaminate PSA construction 130 is passed across the backside surface 136 to a second idler roll 140 that routes the now preheated prelaminate PSA construction across a front side surface 142 of the heated platen 138.

The heated platen 138 is configured so that a leading portion 144 of the front side surface 142 adjacent the second idler roll 140 is heated, and a terminal portion 146 of the platen opposite the leading portion includes means 147 for transferring heat from the front side surface to the backside surface 136. As the prelaminate PSA construction passes over the leading portion 144 of the front side surface 142 the DL becomes heated to a desired activation temperature and then passes over the non-heated heat transferring means 147. Heat from the now activated prelaminate PSA construction passes through the heat transferring means 147 to the backside surface 136 of the platen, causing the now activated prelaminate PSA construction to be cooled, thereby reducing its surface temperature and simultaneously causing the prelaminate PSA construction in contact with the backside surface 136 to be preheated.

Such preheating reduces the amount of energy needed at the front side surface to bring the prelaminate PSA construction up to the desired activation temperature. The use of such preheating technique is desired because it reduces energy costs associated with both heating the prelaminate PSA construction to activation temperature, and cooling the just-activated PSA construction before lamination.

The activated prelaminate PSA construction is passed from the heated platen 138 to laminating means 148, in the form of rollers 150, where a second substrate 152 such as a face stock or the like is laminated thereto under ambient or subactivation process temperature conditions. The laminated PSA construction 154 is collected on a collection roll 156.

If desired, prelaminate PSA constructions of this invention can also undergo different treatments before being activated. For example, first embodiment prelaminate PSA constructions may further comprise printing and the like on a surface of the DL. The DL can be printed upon after the prelaminate PSA construction manufacturing process at a point before activation, e.g., it can be printed at any point before the activation/lamination station 106 in FIG. 11.

Printing on the DL may be desired, e.g., in applications where the second substrate is a clear film, to allow viewing of the printing through the second substrate, or in applications where a backside surface of the second substrate is viewable through a clear substrate to which the laminated PSA construction is applied. It is, therefore, to be understood that prelaminate PSA constructions of this invention may include a DL that includes printing and the like thereon.

First and second embodiment prelaminate PSA constructions of this invention can also comprise a tinted DL. In certain applications, e.g., where the second substrate is in the form of a clear film, it may be desirable to tint the DL to avoid having to use a tinted second substrate, or to avoid having to tint the PSA layer as the use of tint in the PSA layer may adversely affect its adhesive properties. It is, therefore, to be understood that prelaminate PSA constructions may include a DL that includes tinting.

Figure 13:
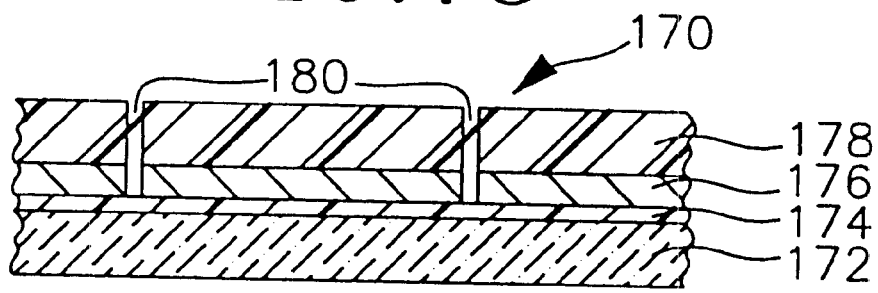
FIG. 13 is a cross-sectional side elevation of first, second and third embodiment prelaminate PSA constructions of this invention having adhesive free zones.

Additionally, before the step of activating first and second embodiment prelaminate PSA constructions it may be desirable to die cut and matrix strip a portion of the DL and PSA layer from the release liner. As illustrated in FIG. 13, first, second and third prelaminate PSA constructions of this invention 170, comprising a release liner 172 having a coating of release material 174 disposed thereon, a PSA layer 176 on the coating of release material, and a DL 178 on the PSA layer, can be configured having one or more adhesion-free zones 180. The adhesion-free zones 180 are defined by surrounding PSA and DLs and extend to the coating of release material of the prelaminate PSA construction. The adhesion-free zones can extend lengthwise in a machine direction and/or widthwise along the prelaminate PSA construction to define islands of DLs and PSA layers. The formation of such adhesive-free zones is desired to prevent gumming of the PSA after activation that can interfere with the lamination process and make separation of the laminated PSA construction from the release liner difficult.

Figure 14:
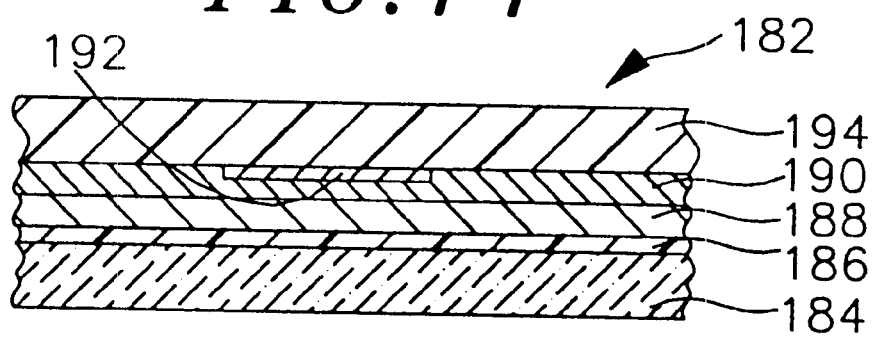
FIG. 14 is a cross-sectional side elevation of first and second embodiment laminated PSA constructions.

Referring to FIG. 14, an exemplary laminated PSA construction 182 based on first and second embodiment activated prelaminate PSA construction (see FIG. 7) comprises a release liner 184 having a coating of release material 186 disposed thereon, a PSA layer 188 disposed onto the coating of release material, and a DL 190 disposed on the surface of the PSA layer. A second substrate 194 is laminated to a surface of the DL 190. The second substrate 194, DL 190 and PSA layer 188 are permanently joined together so that they can be removed together from the release liner 184. Removal of the release liner from the laminated construction exposes the PSA layer for adhering the laminated construction to a desired article or object.

Figure 15:
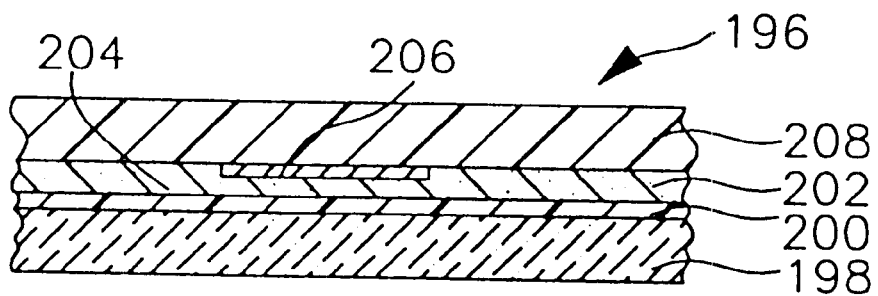
FIG. 15 is a cross-sectional side elevation of a third embodiment laminated PSA construction.

Referring to FIG. 15, an exemplary third embodiment laminated PSA construction 196, based on a third embodiment activated prelaminate PSA construction (see FIG. 8) comprises a release liner 198 having a coating of release material 200 disposed thereon, a PSA layer 202 disposed on the coating of release material, and detackifying material constituents 204 that have migrated into the body of the PSA layer. A second substrate 208 is laminated to a surface of the PSA layer 202. The second substrate 208 and PSA layer 202 are permanently joined together so that they can be removed together from the release liner 198. Removal of the release liner from the laminated construction exposes the PSA layer for adhering the laminated construction to a desired article or object.

Prelaminate PSA constructions, prepared according to principles of this invention, can be used as a means for not only subsequent lamination of second substrates such as face stocks and the like, but can be used as a vehicle for enclosing a variety of different objects, articles or devices. For example, such objects can be incorporated into the prelaminate PSA construction during the manufacturing process between the activation and lamination steps, during the open tack time of the just-activated prelaminate PSA construction.

An example of devices than can be incorporated into laminated PSA constructions of this invention include electronic article surveillance (EAS) devices, such as acoustic-magnetic, electromagnetic, and radio-frequency-type magnetic circuits, and electronic bar code labels and associated systems, can be incorporated into the laminated PSA construction for subsequent attachment to a particular article or object by removal of the release liner for purposes of monitoring the whereabouts of the particular good, e.g., to an article of clothing placed for sale within a store.

Referring again to FIG. 14, with respect to a laminated PSA construction based on first and second embodiment prelaminate PSA constrictions of this invention, an object 192 can be placed onto or embedded into the just-activated DL 190 before the step of laminating. The second substrate 194 is laminated onto the DL 190, thereby encasing the object 192 therebetween.

Referring again to FIG. 15, with respect to a laminated PSA construction based on third embodiment prelaminate PSA constructions of this invention, an object 206 can be placed onto or embedded into the PSA layer 202. The second substrate 208 is laminated onto the PSA layer, thereby encasing the object 206 therebetween.

In forming laminated PSA constructions that include such objects, the objects are inserted after the prelaminate PSA construction is activated during the open tack time period. For example, with respect to first and second embodiment prelaminate PSA constructions, this can be done at the activation/lamination station in FIG. 11 at a point before lamination.

It is to be understood that such objects can be placed on top of the DL, can be embedded into the DL, or can be disposed within a preformed cavity within the DL. It is desired that the object be generally coplanar with the activated surface for lamination to thereby not project into the laminated second substrate and not adversely affect adhesion with the DL.

The type of second substrate that can be used to encase the object in each of the above-described embodiments depends on the particular construction application and on the type of object that is used. For example, if the object is of a slim design and can function, in the case of a functional device, while placed on top of or embedded in the DL or PSA layer, then the second substrate may be in the form of a web or sheet stock. If, for example, the object is not of a slim design or requires an area of unrestricted space for proper operation, in the case of a functional device, the second substrate may be in the form of a housing that is designed to both adhere to the DL or PSA layer and cover an area around the object. In either case, the second substrate may be deformed or shaped to accommodate placement of the object within the construction.

Although limited embodiments of prelaminate PSA constructions and methods for making the same according to principles this invention have been described herein, many modifications and variations will be apparent to those skilled in the art. Accordingly, it is to be understood that, within the scope of the appended claims, prelaminate PSA constructions of this invention may be prepared other than as specifically described herein.

What is claimed is:

1. A method for forming a detackified pressure-sensitive adhesive construction comprising the step of depositing a layer of pressure-sensitive adhesive material onto a coating of release material disposed on a surface of a first flexible substrate, and during the same step simultaneously applying a detackifying material onto a surface of the pressure-sensitive adhesive material to form a continuous film thereon that occludes the pressure-sensitive adhesive layer and that has a minimum 24 hour blocking temperature of about 50° C. at a pressure at about 40 kilopascals, wherein the detackifying material has an open tack time of at least 0.25 seconds.

2. The method as recited in claim 1 further comprising the step of heat treating the detackifying material.

3. The method as recited in claim 1 further comprising the step of heating the detackified pressure-sensitive adhesive construction to an activation temperature to form a tacky surface for lamination independent of the pressure-sensitive adhesive.

4. The method as recited in claim 3 wherein during the step of heating, the tacky surface for lamination is provided in less than about five seconds.

5. The method as recited in claim 3 further comprising, before the step of heating, the steps of:

collecting the detackified pressure-sensitive adhesive construction by placing the detackified pressure-sensitive adhesive construction against a contiguous first flexible substrate surface; and removing the collected detackified pressure-sensitive adhesive construction from the contiguous first substrate surface.

6. The method as recited in claim 5 further comprising, between the steps of collecting and removing, the step of transporting the detackified pressure-sensitive adhesive construction to a geographic location different than that where the step of depositing and collecting are carried out.

7. The method as recited in claim 3 further comprising, before the step of heating, the steps of:

die cutting the detackified pressure-sensitive adhesive construction to form cut patterns of detackifying material and pressure-sensitive adhesive material; and stripping away detackifying material and pressure-sensitive adhesive material from the detackified pressure-sensitive adhesive construction to leave the cut patterns on the first flexible substrate.

8. The method as recited in claim 1 wherein, the detackifying material has a hot melt viscosity that is within a factor of about two times a hot melt viscosity for the pressure-sensitive adhesive.

9. A method for forming a detackified pressure-sensitive adhesive construction comprising a single step of depositing a layer of pressure-sensitive adhesive material onto a coating of release material disposed on a surface of a first flexible substrate, and simultaneously applying a detackifying material onto a surface of the pressure-sensitive adhesive material to form a continuous film layer thereon that occludes the pressure-sensitive adhesive construction and that, in combination with the pressure-sensitive adhesive, is sufficient self supporting to facilitate printing, converting and dispensing, the detackifying material being heat activatable without removal from the construction within less than about five seconds to form a tacky surface independent of the pressure-sensitive adhesive for lamination to a second substrate at a temperature less than an activation temperature.

10. The method as recited in claim 9 wherein the during the step of depositing and applying, the continuous film layer has a minimum blocking temperature of about 50° C. at a pressure at about 40 kilopascals.

11. The method as recited in claim 9 wherein the detackifying material is selected from the group consisting of heat-seal adhesives, modified heat-seal adhesives, delayed action heat-seal adhesives, and mixtures thereof that are heat activatable in less than about five seconds to form the tacky surface for lamination.

12. The method as recited in claim 9 the detackifying material is selected from the group of materials having a hot melt viscosity within a factor of about two times a hot melt viscosity of the pressure-sensitive adhesive.

13. The method as recited in claim 9 further comprising the step of heating the detackifying material to an activating temperature to form the tacky surface on top of the pressure-sensitive adhesive for lamination.

14. A method for forming a laminated pressure-sensitive adhesive construction comprising the steps of:

a) depositing a layer of pressure-sensitive adhesive material onto a coating of release material that is disposed on a surface of a first flexible substrate, and in the same step simultaneously applying a detackifying material onto a surface of the pressure-sensitive adhesive material to occlude the pressure-sensitive adhesive layer and form a nonblocking detackified pressure-sensitive adhesive construction, the detackifying material being heat activatable;

b) heating the detackifying material to an activation temperature to provide a tacky surface independent of the pressure-sensitive adhesive for lamination; and c) laminating a second substrate to the tacky surface of the detackifying material at a temperature less than about 100° C. to form a laminated pressure-sensitive adhesive construction having the second substrate, detackifying material, and pressure-sensitive adhesive layer adapted to be preferentially removed together from the first flexible substrate.

15. The method as recited in claim 14 wherein during the step of heating, the tacky surface has an open tack time in the range of from 0.25 to 5 seconds.

16. The method as recited in claim 14 wherein before the step of heating, the detackifying material is heat treated by heating to a temperature below an activation temperature.

17. The method as recited in claim 14 further comprising, before the step of heating, the steps of:

collecting the detackified pressure-sensitive adhesive construction by placing the detackified pressure-sensitive adhesive adjacent to a contiguous surface of the first flexible substrate; and removing the collected detackified pressure-sensitive adhesive from the contiguous first flexible substrate surface.

18. A method for forming a laminated pressure-sensitive adhesive construction comprising the steps of:

a) heating a detackified prelaminate pressure-sensitive adhesive construction to an activation temperature form a tacky surface for lamination, said pressure-sensitive adhesive construction comprising:

a first substrate comprising a coating of release material disposed thereon;

a pressure-sensitive adhesive disposed on the coating of release material; and a continuous film layer disposed on a surface of the pressure-sensitive adhesive to occlude the pressure-sensitive adhesive layer, the continuous film layer being, in combination with the pressure-sensitive adhesive, self supporting and forming a tacky surface independent of the pressure-sensitive adhesive upon heating to an activation temperature; and b) laminating a second substrate to the tacky surface at a temperature below about 100° C. to form a laminated pressure-sensitive adhesive construction;

wherein, between the steps of heating and laminating, placing an object on the tacky surface.

* * * * *